Figure 1:
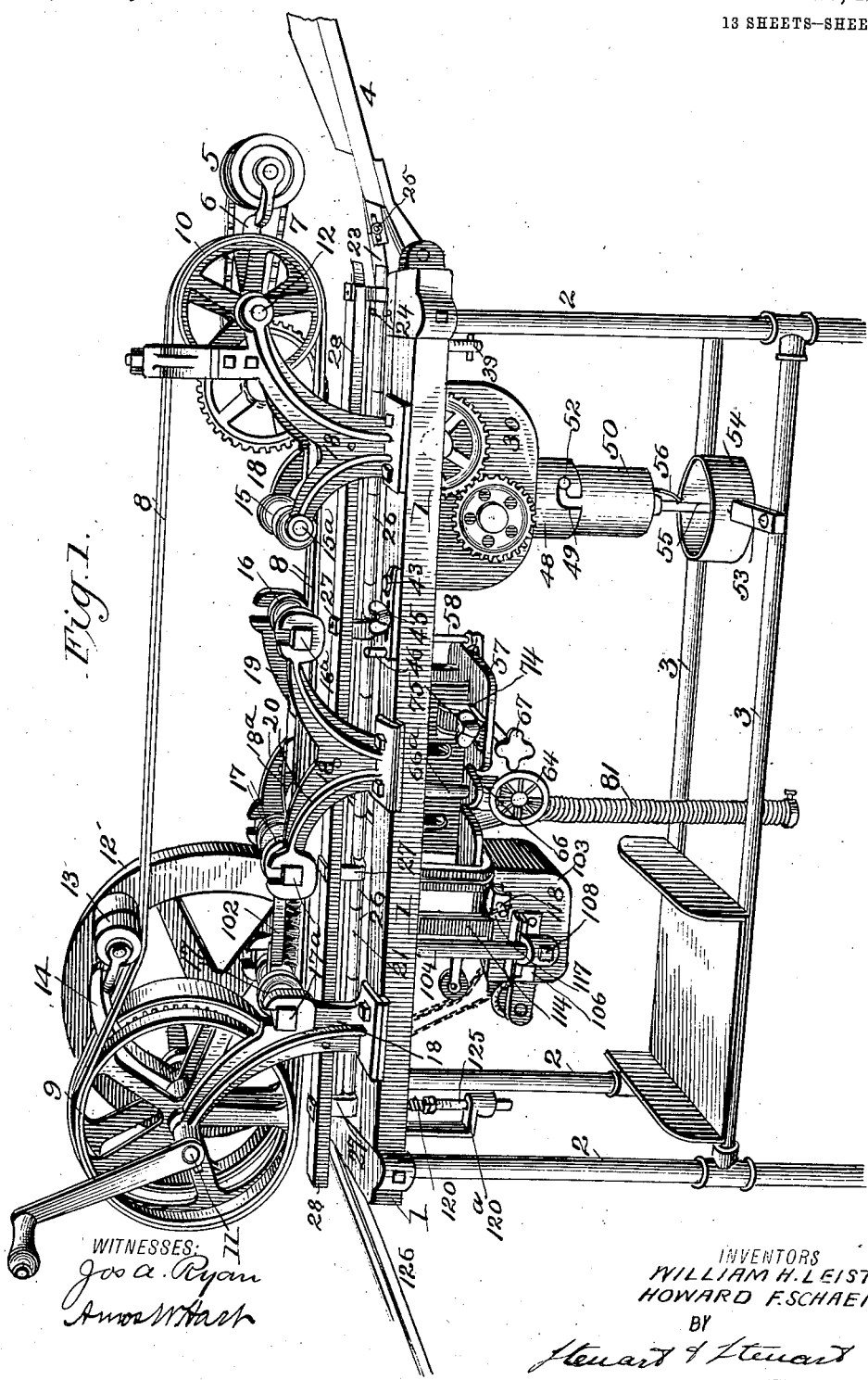

W. H. LEISTER & H. F. SCHAEFFER.
MACHINE FOR LABELING CYLINDRICAL PACKAGES.
APPLICATION FILED FEB. 12, 1907.

1,101,200.

Patented June 23, 1914.
13 SHEETS—SHEET 1.

WITNESSES:
Jos. A. Ryan
Amos W. Hart

INVENTORS
WILLIAM H. LEISTER
HOWARD F. SCHAEFFER
BY
Stewart & Stewart
ATTORNEYS

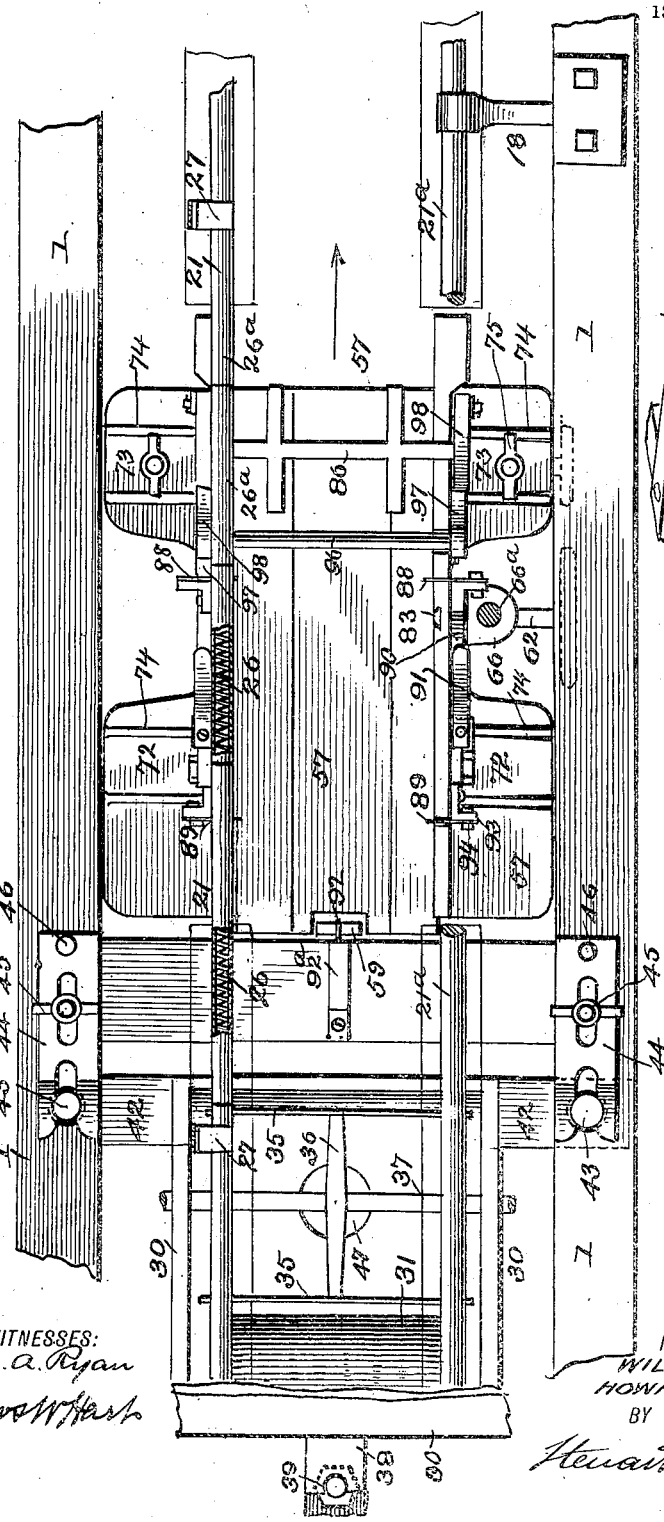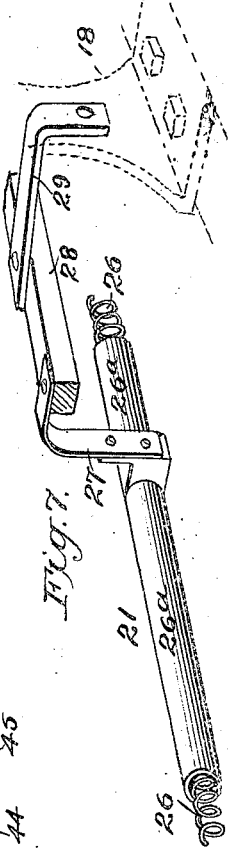

W. H. LEISTER & H. F. SCHAEFFER.
MACHINE FOR LABELING CYLINDRICAL PACKAGES.
APPLICATION FILED FEB. 12, 1907.
1,101,200. Patented June 23, 1914.
13 SHEETS—SHEET 5.
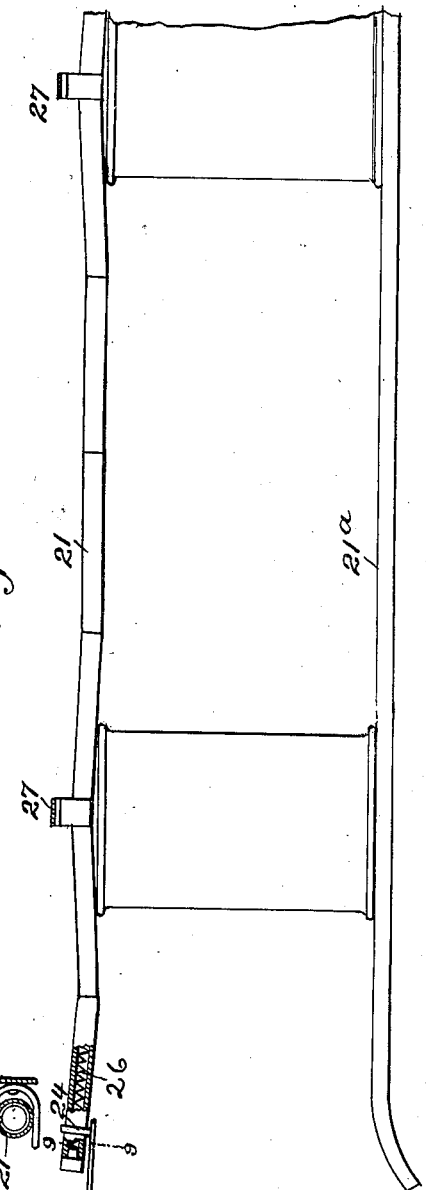
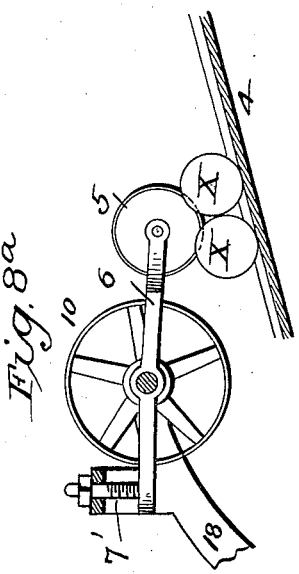
WITNESSES:
Jos. A. Ryan
Amos W. Hart
INVENTORS
WILLIAM H. LEISTER
HOWARD F. SCHAEFFER
BY
Steuart & Steuart
ATTORNEYS W. H. LEISTER & H. F. SCHAEFFER.
MACHINE FOR LABELING CYLINDRICAL PACKAGES.
APPLICATION FILED FEB. 12, 1907.

1,101,200.

Patented June 23, 1914.
13 SHEETS—SHEET 6.

WITNESSES:
Jos. A. Ryan.
Anna W Hart

INVENTORS
WILLIAM H. LEISTER
HOWARD F. SCHAEFFER
BY
Stewart H Stewart
ATTORNEYS

W. H. LEISTER & H. F. SCHAEFFER.
MACHINE FOR LABELING CYLINDRICAL PACKAGES.
APPLICATION FILED FEB. 12, 1907.

1,101,200.

Patented June 23, 1914.
13 SHEETS—SHEET 7.

WITNESSES:

INVENTORS
WILLIAM H. LEISTER
HOWARD F. SCHAEFFER
BY
ATTORNEYS

W. H. LEISTER & H. F. SCHAEFFER.
MACHINE FOR LABELING CYLINDRICAL PACKAGES.
APPLICATION FILED FEB. 12, 1907.
1,101,200.
Patented June 23, 1914.
13 SHEETS—SHEET 8.
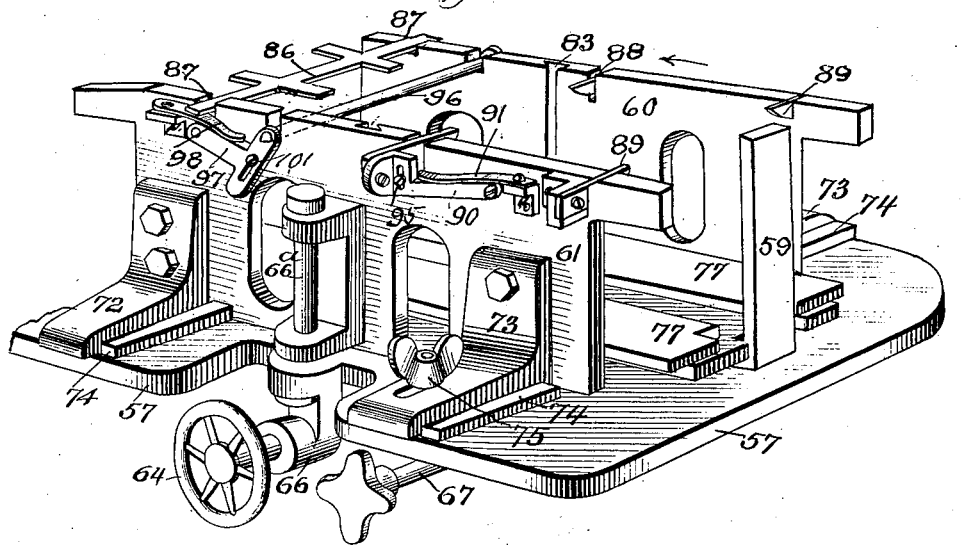
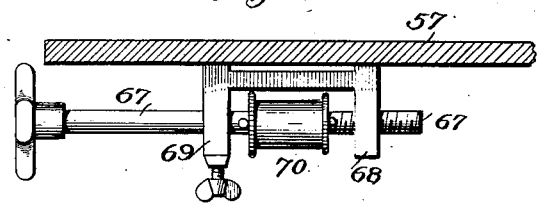
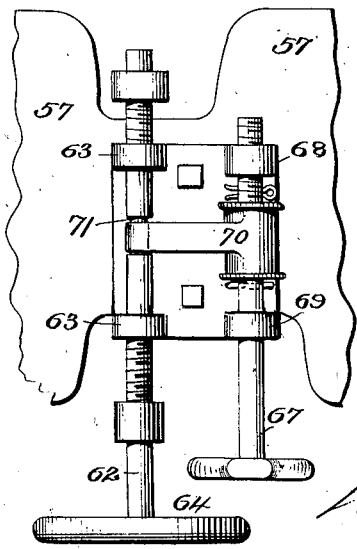
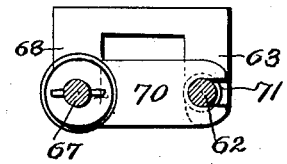
WITNESSES:
Jos. A. Ryan.
INVENTORS
WILLIAM H. LEISTER
HOWARD F. SCHAEFFER
BY
ATTORNEYS W. H. LEISTER & H. F. SCHAEFFER.
MACHINE FOR LABELING CYLINDRICAL PACKAGES.
APPLICATION FILED FEB. 12, 1907.
1,101,200.
Patented June 23, 1914.
19 SHEETS—SHEET 9.
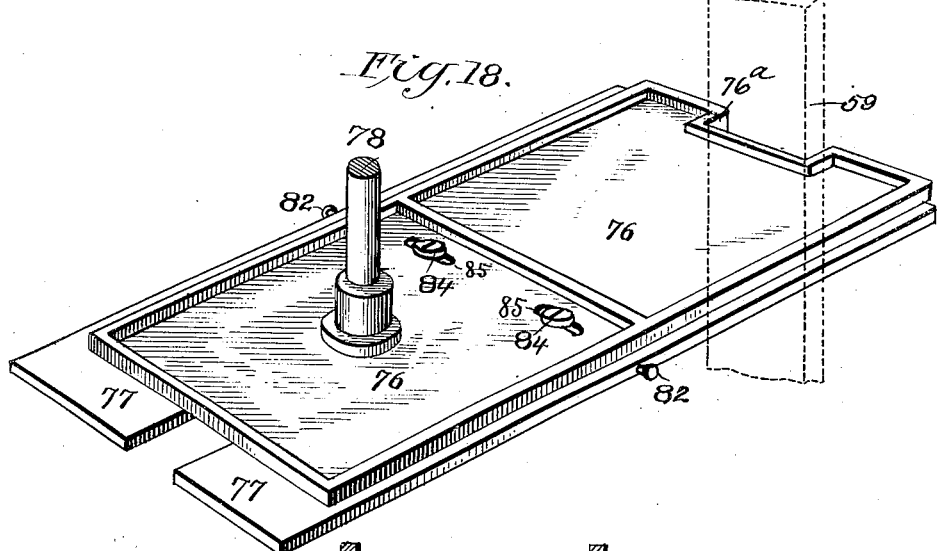
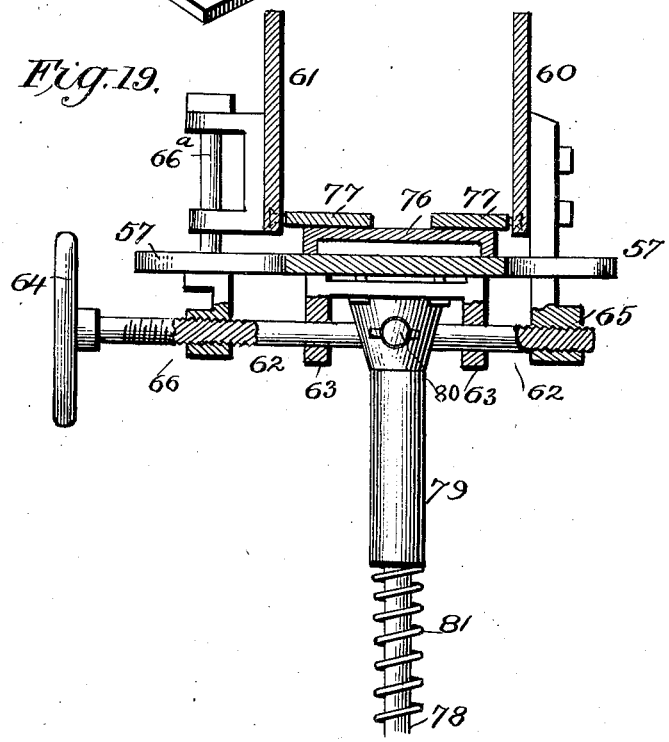
WITNESSES:
Jos. A. Ryan
Amos W Hart
INVENTORS
WILLIAM H. LEISTER
HOWARD F. SCHAEFFER
BY
Stuart F Stuart
ATTORNEYS

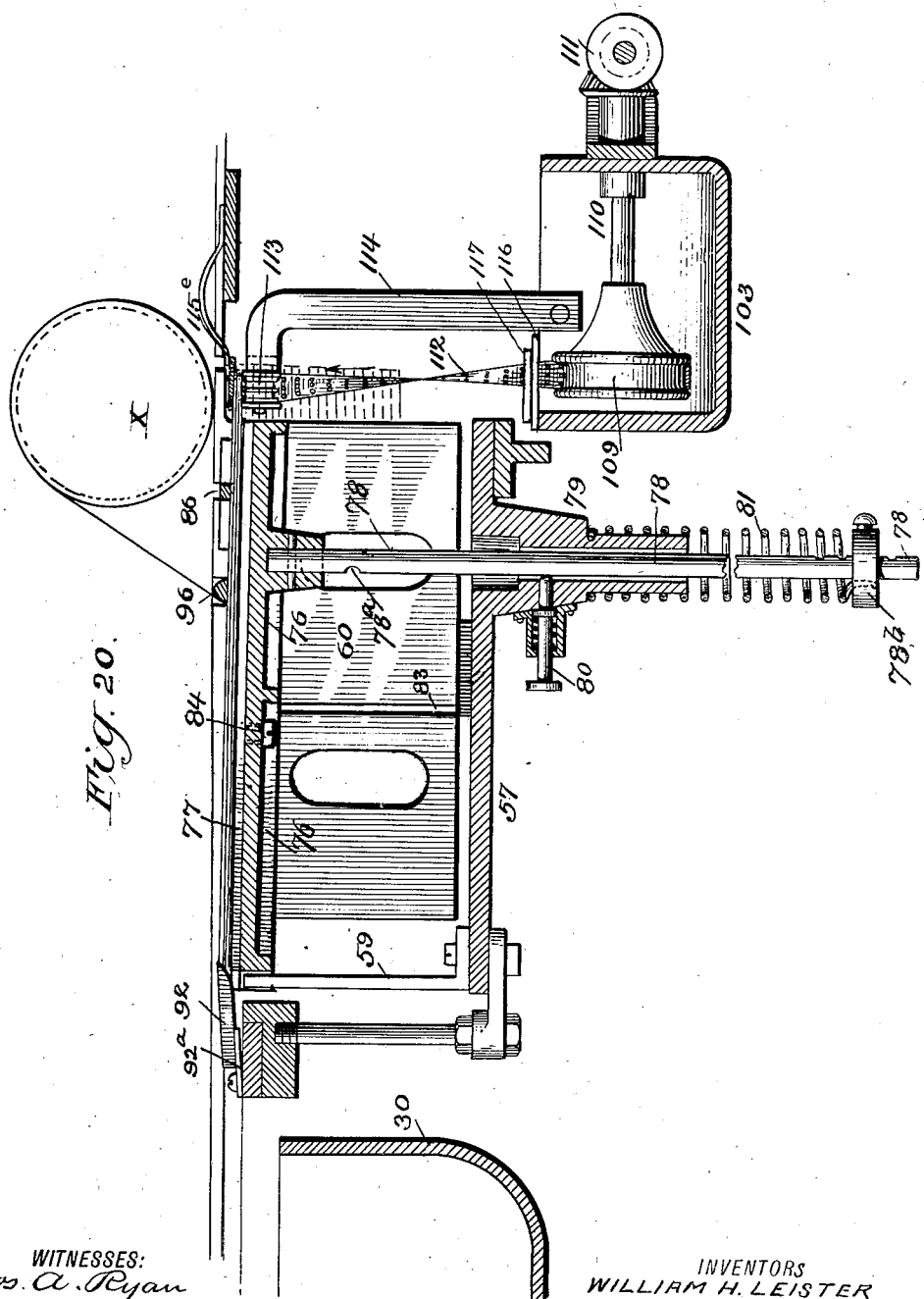

W. H. LEISTER & H. F. SCHAEFFER.
MACHINE FOR LABELING CYLINDRICAL PACKAGES.
APPLICATION FILED FEB. 12, 1907.
1,101,200.
Patented June 23, 1914.
13 SHEETS—SHEET 11.
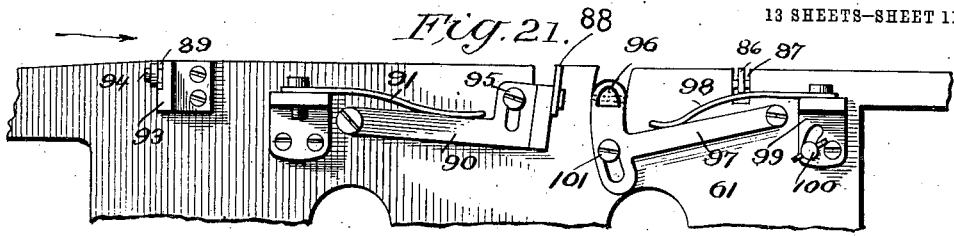
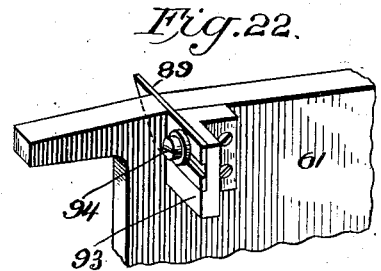
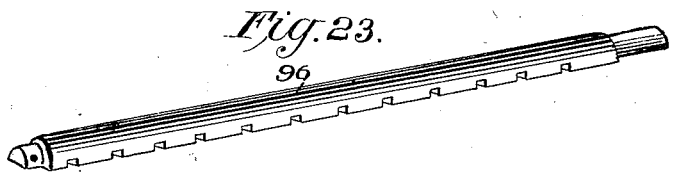
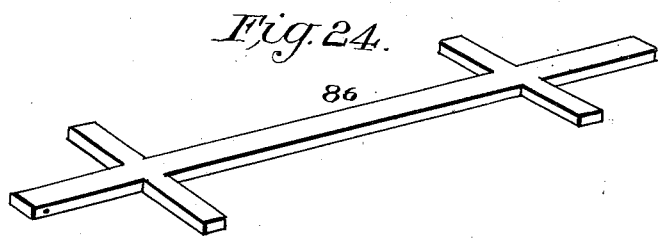
WITNESSES:
INVENTORS
WILLIAM H. LEISTER
HOWARD F. SCHAEFFER
BY
ATTORNEYS

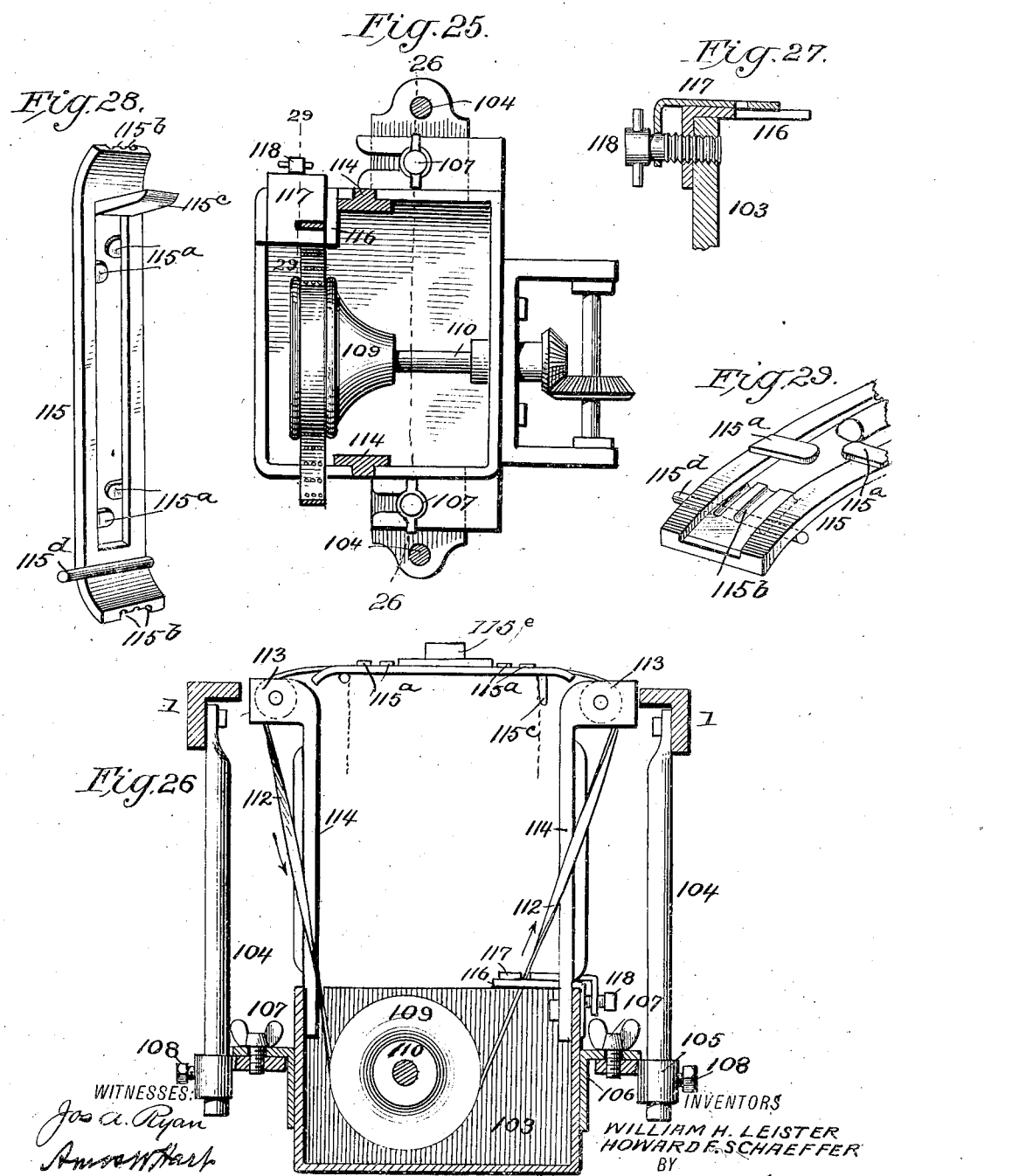

W. H. LEISTER & H. F. SCHAEFFER.
MACHINE FOR LABELING CYLINDRICAL PACKAGES.
APPLICATION FILED FEB. 12, 1907.

1,101,200.                                    Patented June 23, 1914.
13 SHEETS—SHEET 13.

WITNESSES:
Jos. A. Ryan
Anna W Hart

INVENTORS
WILLIAM H. LEISTER
HOWARD F. SCHAEFFER
BY
Stewart & Stewart
ATTORNEYS

UNITED STATES PATENT OFFICE.

WILLIAM H. LEISTER AND HOWARD F. SCHAEFFER, OF WESTMINSTER, MARYLAND, ASSIGNORS, BY MESNE ASSIGNMENTS, TO WESTMINSTER DEPOSIT & TRUST COMPANY, A CORPORATION OF MARYLAND.

MACHINE FOR LABELING CYLINDRICAL PACKAGES.

1,101,200.   Specification of Letters Patent.   Patented June 23, 1914.

Application filed February 12, 1907. Serial No. 357,053.

*To all whom it may concern:*

Be it known that we, WILLIAM H. LEISTER and HOWARD F. SCHAEFFER, citizens of the United States of America, and residents of the town of Westminster, county of Carroll, State of Maryland, have invented certain new and useful Improvements in Machines for Labeling Cylindrical Packages, of which the following is a specification.

Our invention is an improvement in machines adapted for affixing gummed or pasted labels to cans, bottles, or other articles having a cylindrical form. As is well known to experts and manufacturers, machines heretofore produced for this purpose have not operated satisfactorily, especially with labels termed silver, varnish, sized-background, etc., and with cans having wide or deep radial flanges on their ends, such as the so-called "sanitary" cans. We have devised and reduced to entirely successful use a machine which avoids or overcomes these and other difficulties and objections, and applies labels in a superior and practically perfect manner, whatever be their nature or peculiarities, or the irregularities of the cans to which they are affixed.

The novel features of the invention are hereinafter described and claimed, together with others necessary to form a complete and operative machine.

Figure 2:
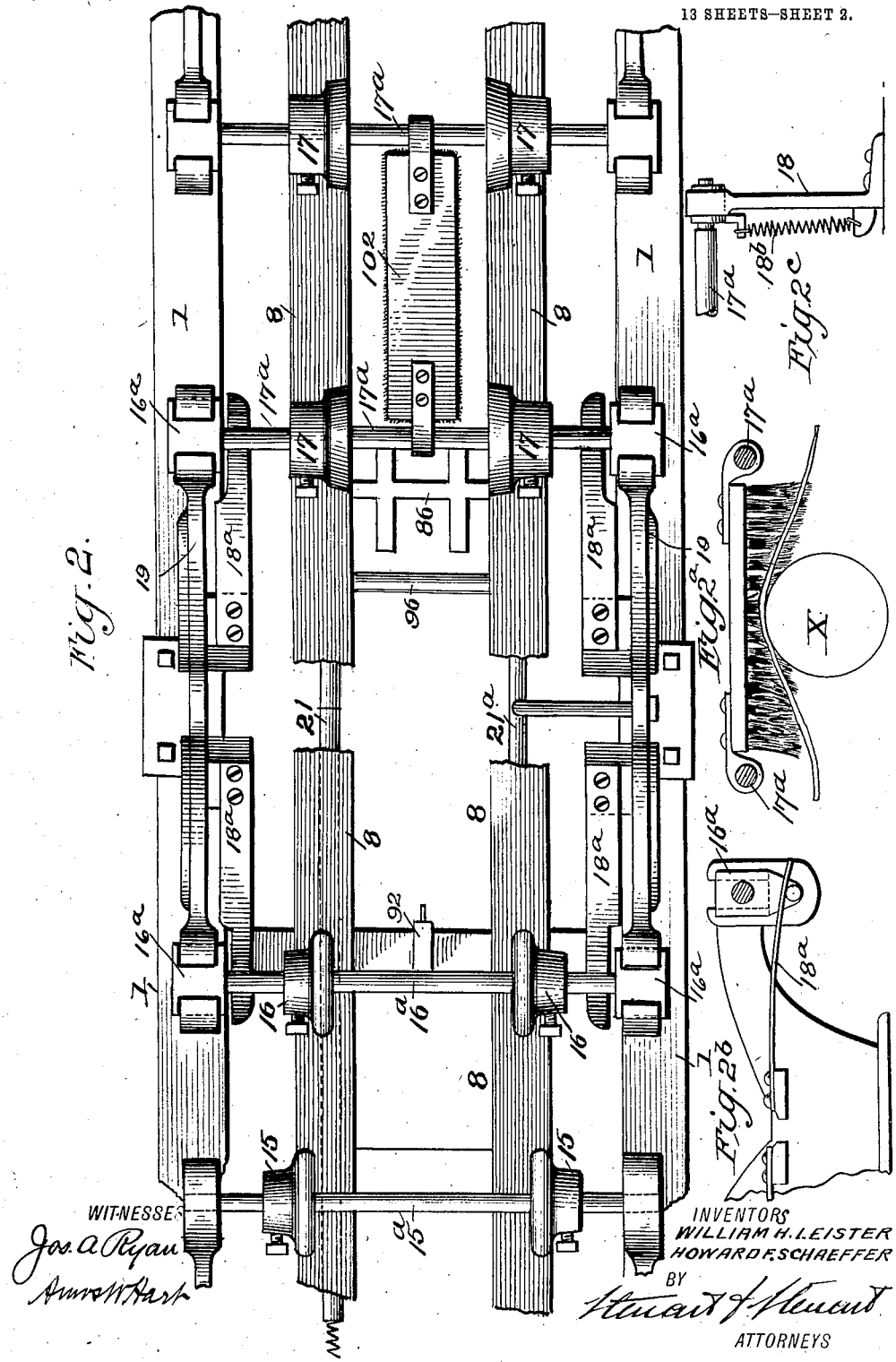
Figure 3:
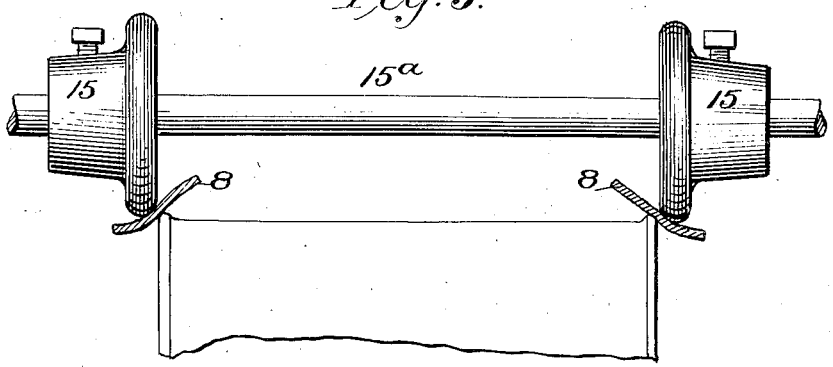
Figure 4:
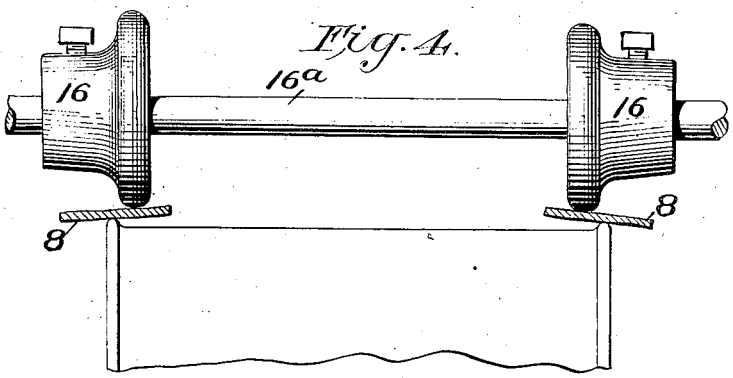
Figure 5:
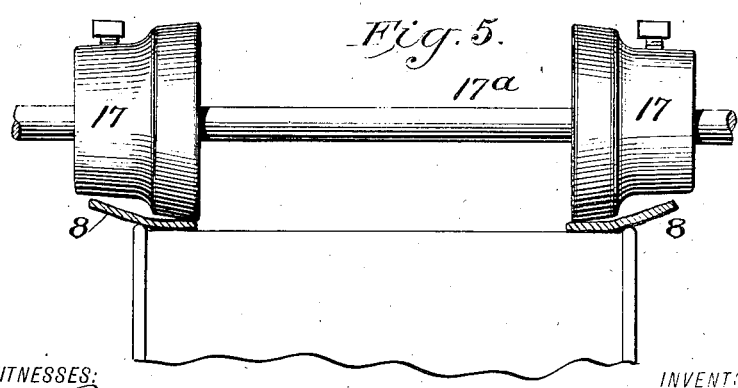
Figure 10:
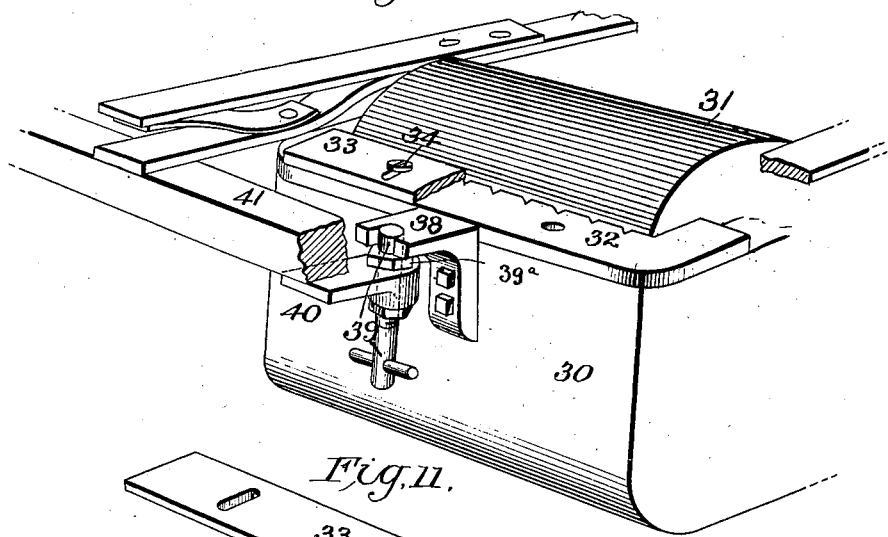
Figure 11:
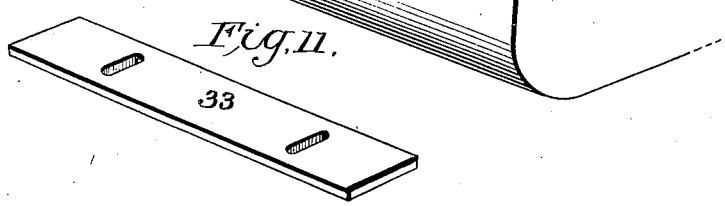
Figure 12:
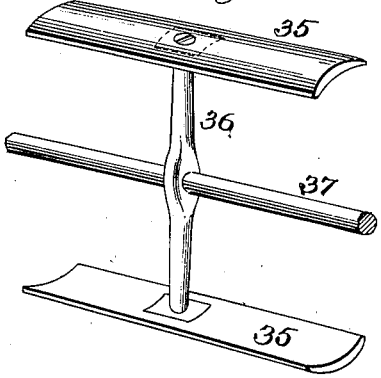
Figure 13:
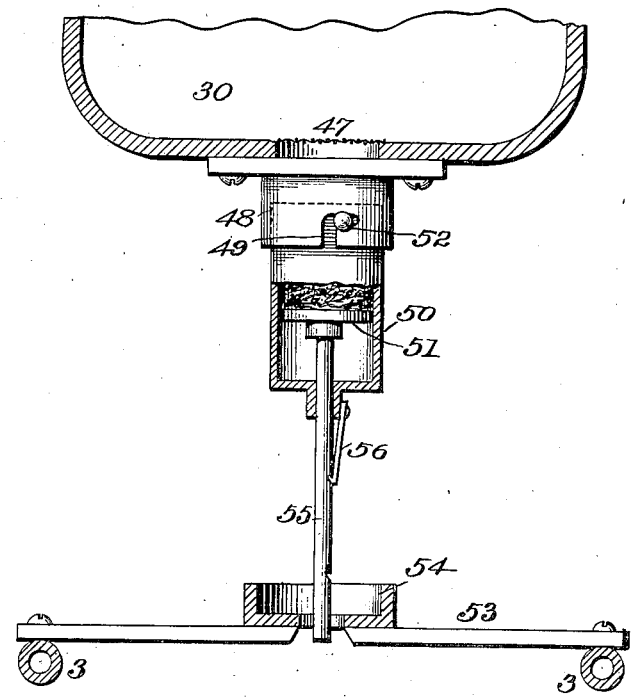
Figure 13A:
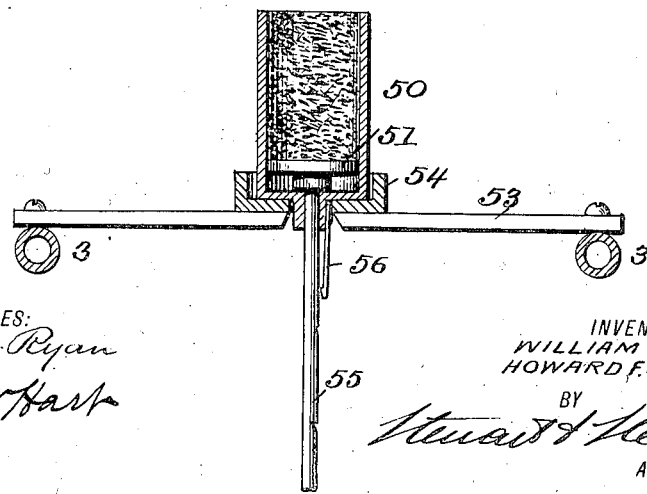
Figure 30:
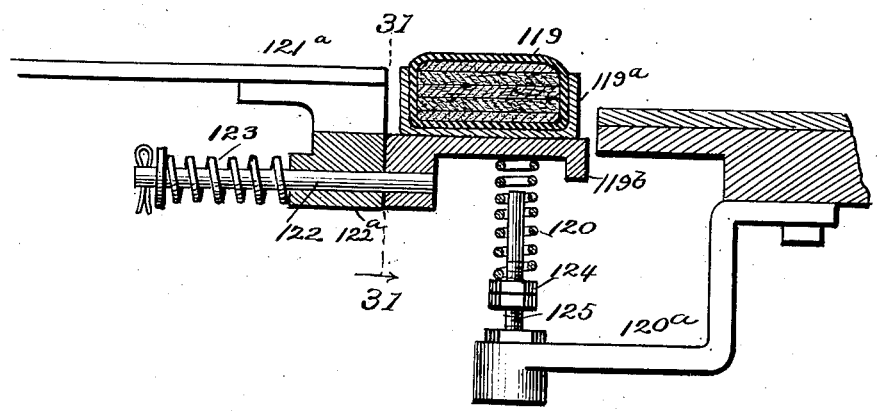
Figure 31:
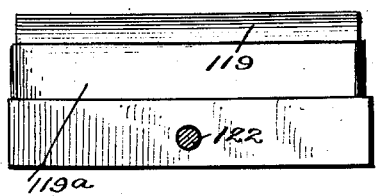
Figure 32:
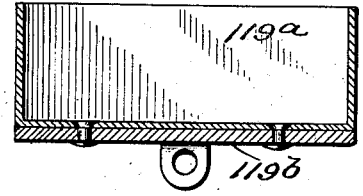
Figure 33:
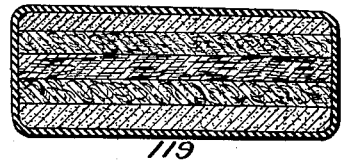

In the accompanying drawings, Sheet 1: Figure 1 is a perspective view of the entire machine. Sheet 2: Fig. 2 is a plan view of the same. Fig. 2ᵃ is a view illustrating the operation of a brush on a label before its lap end is pasted down. Figs. 2ᵇ and 2ᶜ are detail views hereinafter referred to. Sheet 3: Figs. 3, 4 and 5 are views illustrating the coaction of certain rolls with the belts that carry the cans through the runway. Sheet 4: Fig. 6 is mainly a plan view of a portion of the machine, certain parts being removed or shown broken away for better illustration. Fig. 7 is a perspective view illustrating the yielding bar constituting one side of the runway. Sheet 5: Fig. 8 is mainly a plan view illustrating the side rails or guides of the runway and their co-action with cans passing through the latter. Fig. 8ᵃ is a sectional view illustrating the means for regulating the feed of cans to the machine. Fig. 9 is an enlarged cross section on the line 9—9 of Fig. 8. Sheet 6: Fig. 10 is a perspective view of the primary or first paste-holder. Fig. 11 is a perspective view of means for regulating the amount of paste taken up and applied. Fig. 12 is a view of a revolving mixer employed in the paste-holder. Sheet 7: Fig. 13 is mainly a vertical section of the lower portion of the primary paste-holder. Fig. 13ᵃ is a vertical section illustrating the lowered position of the paste-supply device constituting a part of the paste-holder. Sheet 8: Fig. 14 is a perspective view of the label holder proper. Fig. 15 is a vertical cross section of a portion of the label holder. Fig. 16 is a bottom plan view of a portion of the label holder. Fig. 17 is a detail section of a portion of the label holder. Sheet 9: Fig. 18 is an enlarged perspective view of the bottom of the label holder inverted. Fig. 19 is a vertical section of the label holder. Sheet 10: Fig. 20 is a vertical longitudinal section including a portion of the primary paste-holder, the label holder proper and a portion of the second, or final, paste-holder, together with the paste-applying devices pertaining thereto. Sheet 11: Fig. 21 is a side view of a portion of the label holder illustrating label clamping devices applied thereto. Fig. 22 is a perspective view of a beveled label clamp. Fig. 23 is a perspective view of the device or bar by which the curling of the label is immediately produced. Fig. 24 is a cruciform label holder or weight. Sheet 12: Fig 25 is a horizontal section of the second final paste-holder with paste applying devices therein. Fig. 26 is a vertical section on the line 26—26 of Fig. 25. Fig. 27 is a vertical section of a portion of the paste-holder. Fig. 28 is a perspective view of a device applied to the belt which applies paste to the lap end of the label, the same serving as a guard and protector for the side edge of the label pack. Fig. 29 is a perspective view of one end of said device. Sheet 13: Fig. 30 is a vertical section of the portion of the machine including the cushion by which final pressure is applied to the lap end of the label. Fig. 31 is a cross section on the line 31—31 of Fig. 30. Fig. 32 is a sectional view of the box containing the said cushion and the support for the box. Fig. 33 is a longitudinal section of the cushion.

The operative parts of our machine are mounted upon and attached to a frame constructed with special reference to combining maximum lightness, rigidity, and strength. As will be noted in Fig. 1, the top portion of the frame is formed mainly of angle iron bars 1 arranged parallel and supported by four hollow iron legs 2 connected by longitudinal tubes 3. In practice, the said legs are provided with horizontal cast iron bases (not shown). As in other machines of this class, the cans roll down an inclined chute 4 and are propelled through a runway at the top of the machine proper; and, in traversing this the labels are applied, the required operations of pasting the can and labels, and curling and stretching the latter being performed with accuracy and despatch, so that the labels are smooth and firmly secured. The novel and improved mechanism for effecting this result will now be described with the required detail. In passing from the chute 4, the cans are admitted intermittently into the runway, the feed being regulated by wheels 5 (see Figs. 1 and 8$^a$) journaled in pivoted arm 6 adapted to swing vertically, the wheels being driven by an endless chain 7. The rate of feed of the cans may be increased or diminished while the machine is in motion by adjusting the screw 7' so as to regulate the drop of the wheels 5. By thus regulating the feed wheels, the engagement of the same with the cans may be varied; and the latter may be delivered fast or slow as required, without involving any variable speed-driving mechanism. Moreover, the wheels in swinging vertically as they do, drop into any dented portion of a can, and a positive feed of the can is thereby insured, whether its body be perfect or uneven.

The cans are propelled, i. e. rolled, through the runway by means of endless belts 8 arranged parallel, and running on driving pulleys 9 and smaller pulleys 10, mounted in pairs on shafts 11 and 12, and arranged above and at opposite ends of the can runway. The shaft 11 may be driven by any suitable motor, and is geared with a balance wheel 12'. The employment of belts for the purpose of conveying, or propelling the cans through the machine proper, in connection with guiding or controlling devices operating on the belts, is old, and persons not familiar with this art might not, without careful study, notice the features of distinction between the running of conveyer belts, and their controlling devices, as old in the art, and what we claim as new. By experiment we have found that by running the belts in a twist, or at reverse angles, with the degree of their twist or inclination different at the various sections of the belt and greatest at the initial end of the belt, we avoid or overcome serious difficulties and objections, existing in other machines, especially when the belts are run in connection with certain belt guiding and controlling means hereinafter to be described.

Especially designed for use in connection with our form of belt conveyer is a yielding belt-tightener consisting of rollers 13, journaled in the free end of an arm 14 which swings on the driving shaft 11, and is arranged between the driving pulleys, 9. In operation the weight of this device is borne mainly by the belts 8, but when the machine is not in use it is advisable to relieve the belts of any undue strain. To this end, the vertical space between the pulleys 9, allows the rollers to be thrown back off of the belts. For regaining the proper belt tension on replacing the tightener, no adjustment is required: the belt tightener in conjunction with the belt controlling or guiding devices will cause the belts to assume under a constant and uniform tension their desired twists or reverse angles. Again, our yielding belt tightener has another important function. When, in the operation of the machine, the cans come into contact with and press the belts up, the pressure rolls are at the same time forcing the belts down between the cans; and this reverse pressure of cans and rollers on the belts gives the latter an undulation, in response to which our belt tightener is free to yield, while nevertheless maintaining the belt tension constant. The tightener, if non-yielding, would not allow the belts satisfactorily to conform to the curve of the cans, as is necessary in effecting positive conveyance of the latter, nor in such instance would the proper reverse angles or twists be obtained, because of the increased tension on the belt due to the undulated form of the belt. It will also be noted that as the belts stretch, the tightener by gravity follows, thus assuring at all times in a stretching belt, a practically constant tension, and thereby obviating the necessity of cutting and relacing the belt.

In Figs. 3, 4, and 5, the belts are shown running in a twist or at reverse angles by virtue of the position and form of the belt rollers, 15, 16, and 17. These rollers are mounted respectively on transverse shafts 15$^a$, 16$^a$, and 17$^a$, the rollers 15 having fixed bearings in the brackets 18, and the rollers 16 and 17 being held yieldingly (see Figs. 1 and 2) in the parallel arms of vertical brackets 19 and 20, which are bolted to the frame bars 1, 1. As shown in Figs. 3 and 4, the rollers 15 and 16, have convex faces, and (see Fig. 2) the rollers 17, beveled faces. The bearing blocks of shafts 16$^a$ and 17$^a$ are free to slide vertically in slotted portions of brackets 18, and are pressed down by springs 18$^a$ and 18$^b$ (see Figs. 2, 2$^b$, 2$^c$). The horizontal plate springs 18$^a$ bear upon lateral projections of the bearings of shafts 16$^a$ and of the adjacent shaft 17$^a$, and the spiral springs 18$^b$ are arranged vertically. By these means we provide for yielding pressure of the rolls or wheels 16 and 17 upon the belts and cans.

The cans are labeled and propelled through the machine proper, by the coöperation of the belts 8 with certain devices, and with the sets of rollers just described. It is old in machines of this class, as heretofore mentioned, to propel the cans by the means of belts. In the machine of our invention, however, the belts are caused to engage the cans and labels in such a way as to produce a variety of new results. In operation, the first twist or angle of the belts occurs when the can has traveled one half revolution from the paste device; and at this point the belts 8 are canted or raised, as shown in Fig. 3, to prevent their contact with the pasted portion of the can. In certain machines, heretofore in use, on the contrary, the belts by coming in contact with the paste, become gummed, and discolor any light or delicate label. It is old to run conveyer belts at an angle, such having long since been done in can soldering machines. In our invention, however, we avoid the soiling of the labels by employing rollers 15, of special construction and arrangement for twisting the belts. We have found by experiment that the rollers 15, positioned on a transverse shaft, and having convex faces, maintain the belts at the required angles and alinement without the aid of flanges or other devices. We secure an elastic engagement of the belts with the cans, when the latter are opposite the rollers 15, (see Figs. 2 and 3) independently of both the roller bearings and the runway. The bearing edges of the rolls 15 are situated below the highest point of the cans, whereby the inner sides of the belts are raised or gently curved, resting with elastic but duly firm pressure on the flanges or heads of the cans, instead of being pressed positively and unyieldingly thereon, as would be the case if the rolls were arranged with their peripheral bearing points directly opposed to the edges of the can heads. This pressure we vary at will by certain adjusting means. The form and location of the rolls 15, their distance apart, and their arrangement on a single straight shaft, also allow the belts 8 to adjust themselves to any variations in diameter and length of the cans without affecting their action on the cans, and we attain a certainty and uniformity of feed, with an elastic pressure of the belts on the cans. The form of the face of these rollers being convex as stated, and the rollers being without flanges, there is no appreciable wear of the belts by the rollers. The distance between rolls 16 and 16, (see Figs. 2–4) is less than the length of the can, whereby the belts 8, at this point are caused to lie flat on the can heads. Then by throwing the belts into an angular position, the reverse of that assumed by them at the rollers 15, the belts come into a position to engage or hold the label securely on the can when the latter is midway of the label-bed. The can makes one half revolution after picking up the label, before the initial end of the label comes into position to be engaged and held by the belts, and from this point the label is continuously pressed and held by the belts by reason of the reverse angles of the latter, assumed by virtue of the action of the beveled rollers 17, (see Fig. 5), until the lap end of the label is secured. The rollers 16, press the cans on the knife 92, Fig. 20, thus forcing the knife into the pack of labels, whereby the top label is readily picked up by the pasted can, as hereinafter described. The rollers 17, are beveled as shown in Figs. 2–5, whereby the belts, as stated, are caused to run at an angle, reverse to that made by the belts at the rollers 15. This beveled form of roller, having its greatest diameter on the inside, assures the belt being firmly pressed down on the labels, and prevents dislocation of the label on the can while the label is being drawn from the label box. It is of special importance in labeling cans having wide or projecting heads or flanges. The various operations of these rolls, acting on the belts 8 as described, produce results not heretofore accomplished. For instance, the labels are as firmly held on cans having widened heads, as on the ordinary can, since the labels are absolutely prevented from sliding or shifting. This feature is important, especially with hand labels, i. e., those labels having lines of printing or ornamentation which must meet at the lap, or otherwise render a package unsightly and objectionable.

In addition to the features just indicated, we provide for lateral adjustment of the rolls on the shafts by means of clamp screws, to accommodate them to variation in length of cans of different manufacture, and also to vary their pressure upon the belts, whereby the angle and friction of the latter with the can heads may be varied as required, to insure due uniformity of feed or advance of the latter along the runway.

The can guides, or the parallel sides of the can runway (see Figs. 2, 6, 7, 8, and 9) are formed of a movable or yielding member 21 and a fixed member 21$^a$. The latter is a round rod supported by vertical brackets 18, and is placed as low as practicable relative to the bed of the can runway, so that it will be considerably below the middle of the adjacent can ends, and hence will not come in contact with such lumps of solder as may adhere to them; for, as is well known to experts, when cans leave the capping machine, solder is often deposited on their tops and projects therefrom sufficiently to contact with the side guides, and thus to constitute a serious obstruction to free and uniform rotation of the cans in the runway and often to cause the cans to be choked or stopped in the passage. Movable or yielding can guides, as heretofore employed, at times do not, for the reasons just pointed out, operate successfully when the cans have lumps of solder deposited on their heads. The construction and continuous form of our guide overcomes this and other difficulties to be explained. As a can enters the runway (see Fig. 8) it is pressed between the movable and fixed guides 21 and 21ª, and the former yields or is moved out laterally to accommodate the length of the can. The end of the fixed guide 21ª is turned outward to facilitate such entrance. The free end of the movable guide 21 is attached to and in part supported in due position by a plate spring 23. This spring is riveted to the side of the feed chute 4, and extends into the runway proper, and has its rear or inner end loosely connected with the guide 21 by a form 24 (see Fig. 9). The inward inclination of the spring guide 23 is regulated by a set screw 25 as shown. The spring 23 must be placed at an angle or inclination in order to accommodate cans of different lengths.

Many attempts have been made to produce a perfect or satisfactory movable guide, one which shall have a due degree of elasticity and flexibility, and shall apply a duly firm, continuous, and practically uniform pressure to the cans. As the final result of our efforts and experiments, we have devised a guide possessing these qualities and thus fulfilling all requirements.

Our movable guide comprises a spiral coil of spring wire 26 (see Figs. 6, 7, and 8) supported horizontally by a series of curved spring hangers 27, these hangers being secured to a longitudinal bar 28 curved downward on its inner side, and in turn supported by rigid arms 29 extending laterally inward from the adjacent brackets 18. The wire coil 26 passes loosely through blocks fixed on the lower ends of hangers 27, and is incased at intermediate points by elongated cylindrical sleeves or tubes 26ª. The latter impart rigidity to the coil to the extent of their several lengths, and also prevent wear of the spring, and form a smooth cover for the same, while leaving the coil free to bend at the joints or meeting points of the sleeves. The adaptation of the guide 21 to yield and bend laterally to accommodate a can, is illustrated in Fig. 8; and it will be noted that the elasticity of the hangers 27 is of importance at the time the cans pass them. The cylindrical sleeves or casings present a smooth surface to the cans, and are adapted to rotate and produce minimum friction, while a duly elastic or yielding pressure is maintained, so that any variation in the length of the cans or the presence of lumps of solder thereon are accommodated, and the cans are held constantly against the fixed guide 21ª. It will be noted that the blocks or boxes attached to the supporting spring 27 constitute in effect a part of the rail or movable side guide, and are flush with the tubular covering, or sheathing, 26ª. In further explanation of another feature, it may be stated that the distance between the fixed and movable guides 21, 21ª, is normally less than the length of the cans, but it is necessary that at the initial or front end of the runway this distance shall be greater in order to allow the cans to enter freely. To this end, the fixed guide is bent outward as shown, and the free end of the flexible or yielding guide is held at an angle by the spring 23 (see Fig. 8). While the inward inclination of this spring is adjustable by the set screw 26, the elasticity of its inner or free end allows a can to pass freely. The tension of the spring is sufficient to hold the flexible guide at an angle as shown, and a can passes readily from one to the other.

Having now described the runway, the feed belts and the means for holding them in the required relation to the cans, we will pass to description of the first, or primary, paste-holder, illustrated in Figs. 1 and 6, and Figs. 10 to 13ª inclusive. Within the hollow body 30 of the paste-holder is arranged a rotatable cylinder or roller 31 having a smooth periphery. On one side and at the top edge of the body 30 (see Fig. 10) is arranged a scraper 32 the inner edge of which is provided with notches to adapt it to form the paste on the cylinder into strips, spaced apart. This scraper 32 has its notches of any desired shape, such as V, U, etc., spaced apart. The portion of the edge between the notches is against the paste roller 31 and scrapes it practically dry, or leaves very little paste on the roller between the notches. This arrangement divides the paste into ridges or strips a distance apart, and these are transferred from the roller to a can and flattened out to thin layers, when the can comes in contact with the pick up or initial end of a label. Upon the scraper 32 is arranged an adjustable gage 33 (see Figs. 10 and 11) the same consisting of an oblong straight-edge plate, having transverse slots through which pass screws 34 for securing it adjustably to the part 32. It will be seen that by adjusting the gage 33 laterally, the amount of paste taken up by the roller and allowed to pass the scraper 32 may be regulated as required. The roller 31 is preferably made of brass covered with rubber. The roller comes in contact with the cans passing through the runway already described, and applies the paste in a narrow strip extending practically the length of the can bodies. Experience has demonstrated that the usual method of applying ordinary flour paste to a can for taking up a label is not successful, particularly with varnished or heavy labels, that when such paste is applied evenly to a can it does not have the same degree of adhesiveness as when applied in ridges or streaks. It is manifest that the roller 31 will apply paste to the cans in the form of ridges or streaks, and that when so applied, upon contact with the labels, the paste ridges will flatten or press out. It is at the extreme lateral edges of the pressed paste where the label should be held most firmly. By applying the paste as above, the labels are held at the edges more securely than they would be were an even coat of paste applied to the can, in which latter case the label would have no stronger hold at any one point than another. Another important feature in applying paste in this manner, is that rust spots are avoided at the lapped end, or pasted portion of the can. A continuous or uniform layer of paste between tin and paper requires a longer time for drying than a layer which is of uneven depth as in the case when paste is applied in ridges or streaks, and unless the paste does dry quickly, in the case of light, delicate, soft labels, the tin is liable to become so rusted that small rust spots finally appear on the surface of the label, making an unsightly and objectionable package. Within the paste-pot or paste-holder 30, and in rear of the roll 31 (see Fig. 6) is arranged a rotary stirrer (see Fig. 12) which comprises two oblong curved plates 35 supported by radial arms 36 attached to a rotatable transverse shaft 37. This stirrer is rotated by sprockets and chain, and a suitable gear connection with the shaft 12 of the machine, which require no detailed description. It will be seen that the stirrer not only acts as such, but also carries or forces the paste toward the roll 31, so that a constant or uniform feed of paste is obtained. Without this stirrer the roll 31 would soon wear a channel in the thick paste, and then no more of the latter would be brought in contact with the roller unless the holder 30 is refilled, or other means provided for pushing the paste against the roller. Not only is the gearing which drives the roll and stirrer removable, but the holder itself is adapted to be easily and quickly detached or replaced when it is required to be cleaned, or for any other purpose. To this end, it is provided on the front side (see Fig. 10) with a right angular lug 38, the outer slotted end of which engages a vertically adjustable pin 39, held in a bracket 40, forming an attachment of one of the cross bars 41 of the frame. At its rear end (see especially Fig. 6) the paste holder 30 is provided with lateral arms or projections 42 that extend beneath the side rails 1 of the frame. Short bolts 43 pass down through these rails, and are detachably connected with the arms 42. Upon the top of the rails 1 is arranged a slide 44 having at one end a notch or open slot, and in its body or main portion, a closed slot through which passes a screw having a clamp-nut 45. The slides are provided at their ends with a vertical pin 46 by means of which they may be readily adjusted, i. e., slid, along the rails 1. As shown in Fig. 6, the formed or slotted end of the slide passes beneath the head of the screw 43, and thus supports the rear end of the paste-holder 30. The forked end is beveled or wedge-shaped, as indicated by cross lines, so that the slides may be adjusted for the purpose of raising the bolts 43, so as to hold the arms of the paste-holder upward against the under side of the rails 1. The screw nut 45 serves to clamp the slides in any adjustment. Thus, by simply loosening the nuts 45, the slides may be drawn back, allowing the bolts 43 to drop down through the holes in the rails 1 so that the rear end of the paste-holder 30 is detached. This allows the bracket 38 to be released from the pin 39. Vertical adjustment of the front end of paste-holder 30, (see Fig. 10), for raising or lowering the roller 31, as may be required, is effected by the screw-threaded pin 39 working in the threaded bracket 40 and carrying a nut (39ª) which engages bracket 38. A jam nut is applied to the pin, as shown in Fig. 10, to lock the pin in any adjusted position.

As will be observed by inspection of Figs. 1 and 13, the lower side of the paste-holder is formed in part of a paste-supplying means now to be described. The bottom of the paste-holder proper, 30, is provided with an opening 47, and a tubular downward extension 48 is attached to the bottom of the paste-holder and provided with curved, or bayonet, slots 49 on opposite sides. A paste-holder 50 consisting of a cylinder, open at the top, and a piston 51, adjustable therein, is detachably connected with the part 48, by means of lateral pins 52 on the cylinder 50, adapted to enter and lock in the aforesaid slots 49. Upon the longitudinal bars 3 (see Fig. 1) of the frame of the machine, is supported a transverse bar 53 having a central perforation, and upon this bar is in turn supported a socket piece 54 having a central opening adapted to receive the rod 55 of piston 51. The socket 54 is adapted to receive and support the paste-holder 50, as shown in Fig. 13ª. The cylinder 50, together with the piston 51 and its rod 55, may be easily detached when it is required to charge it with paste. For this purpose it is set in the socket 54, as shown in Fig. 13ª, and filled, whereupon it is raised and reengaged with the circular boss 48 as shown in Fig. 13. Then, by applying upward pressure to the rod 55, the charge of paste may be forced into the holder 30 as required. A spring catch 56 is attached to the lower end of the paste-holder 50 and its hooked free end is adapted to engage notches formed in the piston rod 55, so as to support the piston at any required height. A galvanized wire screen covers the opening 47 for the purpose of straining the paste, as it is forced through into the holder 30, by the piston 51, whereby any lumps of paste are mashed or made fine, thus preventing the clogging or filling up of the notches in the scraper 32.

It will be seen that the paste-supply device is practically a part of the paste-holder proper 30, since it serves as a bottom or a necessary part thereof, save when detached to be filled with paste. In other words, the paste-holder is made in two parts, a body 30, and a detachable follower bottom 50, the latter being adapted to be conveniently refilled without removing the main portion 30 of the paste-holder. The follower bottom may, however, of course remain attached to part 30, when the latter is detached from the frame.

When paste has been applied to a can by the roller 31, as before described, the can passes on over the label bed, and the front end of the topmost label comes in contact with, and adheres to, the paste ridges or strips, so that the label is taken up and wound around the can, its opposite end being pasted by means which will be presently described. The label holder or box is shown detached (but not complete) in Fig. 14. It is shown provided with a broad flat base, or bottom piece 57, and this, as shown in Fig. 1, rests upon pendent brackets or supports 58 attached to the main frame of the machine. A vertical plate or bar 59 is arranged at one end of the base 57, and against this, one end of the bunch, or pack, of labels abuts. The label plate 76 in its vertical movement, is guided by the notch 76ª, (see Fig. 18) formed in one end thereof. This notch receives a vertical bar 59 secured (see Fig. 20) to base plate 57 of the label-holder. Without this guide notch 76ª the label plate 76 would turn or twist laterally more or less, thereby throwing the socket 78ª in the shaft or rod 78 out of line with spring stop 80, whereupon the latter would not act to hold down the label plate during the refilling of the box with labels. It is obvious the particular form of bar 59 and notch 76ª are unimportant. The vertical bar 59 serves as an end guide for the labels, as well as a lateral guide for the label plate 76.

60 and 61 indicate the two vertical sides of the label holder. These require to be adjusted from and toward each other according to the varying width of labels, so that the latter may be held in alinement with the runway, before described, and thus be applied to the cans with due accuracy. Adjustment of the sides 60, 61, is provided for by means of a screw shaft 62 (see Figs. 14, 16, 17, 19) mounted slidably in lugs or arms 63 (Figs. 16-19) pendent from the base 57 of the label holder. This shaft is provided with a hand wheel 64, and its ends are provided with right and left hand screw threads, which work in threaded sockets formed in pendent arms 65, 66, connected with the respective sides 60, 61. That is to say, the arm 65 is rigidly attached to the side 60 of the label holder, while the side 61 is swiveled on the cylindrical portion 66ª of the arm 66. It is obvious that by rotating the shaft 62 by means of a hand wheel 64, the sides 60, 61, will be caused to approach or recede from each other. This adjustment will accommodate the sides to labels of varying widths. Labels are frequently slightly wider at one end than at the other, and by pivoting the side guide 61 on part 66ª, it is allowed to adjust itself parallel with the other guide, or at any required angle thereto. If the labels are wider at one end than the other, it will be seen that the guide 61 when drawing in and against the labels, will automatically adjust itself so that the labels will be held in position, as when of uniform width. In order that the sides 60, 61, when set in any relative adjustment, may be adjusted together laterally in due relation to the runway, we employ the following means: As shown in Figs. 14, 15, 16, a shaft 67 is journaled in lugs 68 and 69 pendent from the base 57 of the label holder. The portion of the shaft 67 passing through the lug 68 is screw threaded but the shaft is adapted to slide in the other lug 69. Intermediately of the lugs 68, 69, is an arm 70 on the shaft 67, free to turn in relation thereto but longitudinally fixed, the slotted free end of which is engaged with a grooved portion 71 of the shaft 62. It is apparent that, by rotating the shaft 67, it will be moved endwise, and that the lateral arm 70 will thereby be caused to slide the shaft 62 in its bearings, whereby the sides 60, 61, of the label holder will be shifted laterally, correspondingly. In other words, by the mechanism described, the two sides 60, 61, may be shifted bodily and together, without altering the distance between them. By this means, after the walls of the label box have been relatively adjusted to the size and shape of the labels, the box or labels as a whole may be properly centered with respect to the runway, or may be so disposed with respect to the runway as to cause the labels to be applied to any desired parts of the can body. Each of the sides 60, 61, is provided with right angular arms or brackets 72, 73, extending laterally, parallel to each other, and being bolted to the sides as indicated in Fig. 14. These devices constitute vertical supports and lateral guides for the sides 60, 61, their horizontal portions being adapted to slide between cleats 74 fixed on the base 57. A clamp screw 75 is applied to one of the guide arms 73 for the purpose of clamping the sides 60, 61, firmly in any position to which they may be adjusted. It will be noted that the side 61 is practically pivoted or swiveled on the arm or shaft 66ª, so that it has a slight oscillation in a horizontal plane. The guide arms 72, 73, of the side 61, are beveled, or tapered, slightly in their horizontal portions, in order to adapt them to permit this oscillation or adjustment of the side 61.

The bottom of the label holder is shown in Figs. 14, 18, 19. It comprises a central base plate 76, and two adjustable sections or top plates 77. This bottom makes a solid foundation for the pack of labels. The base 76 is provided with a pendent guide rod 78 which passes down through a guide tube 79 forming an attachment of the base plate 57 of the label holder and provided with a spring pin 80 (see Fig. 20) adapted to enter a socket 78ª in rod 78 to lock the rod and hold the bottom 77 of the label plate down when required. A spiral spring 81 (see Fig. 20) is applied to the lower portion of the rod 78 and serves to press the bottom of the label plate upward so that the top label is always in position to be engaged by the can. The spring is attached to a collar 78ᵇ vertically adjustable on the rod to vary the tension of the spring. The bottom of the label plate must fit closely up to the sides or side guides 60, 61, at the points where the labels engage the knives, since, if any considerable space be left between them, the side edges of the labels at the bottom of the pack will tend to drop or bend down into such space, and the labels thus fail to be taken up and applied to the can with required accuracy. The slidable plates or sections 77 are held close to and in proper relation to the side guides 60, 61, by means of pins or screws 82 (see Figs. 18, 19) fixed in the center of the lateral edges of such sections, and provided with enlarged heads that enter and are adapted to slide in dove-tail grooves 83 (see Fig. 14) formed in the inner sides of the guides 60, 61. Guide and clamp screws 84 are arranged in slots 85 formed in the base 76 of the label holder bottom, and hold the sections 77 to this base, as will be readily understood. When these screws 84 are sufficiently loosened, the sections 77 will slide on the part 76 (see Fig. 19) and thereby follow or conform to any lateral adjustment of the side guides 60, 61.

For the purpose of holding down and preventing the labels from shifting, and for compressing the pack of labels in the manner required, so as to prevent fluttering of the top label when the machine is running at a high rate of speed, we employ the following devices: Near the rear end of the label pack rests a bar 86 (see Figs. 14, 20, 24) of a double cruciform shape, its ends projecting into and being adapted to work vertically in open slots or notches 87, formed in the top edges of the side guides 60, 61. This device operates by gravity only, and serves to hold the labels down; also in case the varnish on their label faces causes them to adhere to each other, it prevents the labels beneath the top one from being drawn up when the top one is being removed by a can. Near the middle of the side guides 60, 61, are arranged two vertically movable devices 88 (see Figs. 14, 21) and, at the front end of the same, two fixed devices 89 (see Figs. 14, 21, 22) both of which resemble the points of knife blades, being sharpened, and beveled or rounded, on their under side, or the side that rests upon the label pack. As shown, these devices 88, 89, project inward from the sides 60, 61. The middle ones 88 work in vertical slots formed in the side guides 60, 61, and are attached to the pivoted lever arms 90, upon which plate springs 91 are arranged to press downward. While the knives 88, 89, hold a pack of labels down in the required manner, yet they permit them to be detached and lifted individually with ease, since the edges of the labels are either drawn off the bevel points or slitted thereby when lifted. To prevent a double pickup or fluttering of labels devices have been applied to the sides of the labels, but these have not successfully served their purpose. It is principally when cans are running through the machine at a high rate of speed that this serious difficulty is experienced. To meet it, we place centrally of and on the extreme front edge of the label pack a knife 92 (see Figs. 6 and 20) resiliently held by a light plate spring 92ª. The point of the knife extends slightly over the label pack, the spring allowing the point to be pressed into the label pack, by the can, through the action of the spring pressed roller 16. "Fixed stop knives" 89 are placed on the side near the front end of the label holder, to insure the labels being kept at a certain height, or at a level with the can track or runway, whereby the labels are caused to come into positive contact with the pasted portion of the can.

88 are movable knives, the function of which is to prevent more than one label being drawn out at one time from beneath the curling rod. Chiefly on account of embossing, the thickness of a pack of labels is often greater at one end than the other, and it is due to this variation that we employ the movable knives, since it will be seen that if the knives 88 were fixed, the labels, being thicker at one end than the other, would fail to come into contact with either knives 88 or 89, as the case might be.

Great difficulty has been experienced in this class of machines, in applying the lapped ends of the labels to the cans, and this difficulty has been experienced particularly with thick, varnished, or stiff labels. We have devised practically a perfect remedy for this fault, consisting of a simple device adapted for curling the lapping ends of the labels. Near the rear end of the label holder, we arrange transversely a rod 96 (see Figs. 14, 20, 21, 23) rigidly connected to one of two T-shaped arms 97 which are pivoted to the sides of the label guides 60, 61, and upon which springs 98 are adapted to press downward as shown. The pressure of the springs may be varied at will by adjustment of the rocking head 99 to which they are secured. Such head or bracket is pivoted and provided with an arc-shaped slot through which passes a clamping screw 100. It is obvious that by placing the head 99 at different angles and clamping it, the spring 98 may be caused to press upon the arms 97 with varying force and thus the bar 96 may be caused to press upon the labels with corresponding force. The head of the levers 97 is provided with a slot through which passes a guide screw 101 (see Fig. 21). As shown in Figs. 21, 23, the under side of the bar 96 is flat and provided with transverse grooves (see Fig. 23) and its front edge is rounded at the top side. As shown in Fig. 20, when a can X rolls over the labels, and one end of the top label has been pasted to it, as the can passes beyond the curling bar 96, such label is drawn sharply over the front edge of said bar 96. This bar being stationed near the center of the label pack, nearly one half of the free end of the label is caused to be drawn sharply over the rod, and it will be noticed that the can after passing this rod in its travel causes the label to have a forward instead of a direct upward pull as the label is being withdrawn from beneath the bar. This action on the label destroys its life or springiness and tends to make it conform to the curvature of the can, so that when finally wrapped and seamed, it is held securely. The initial, or other end of the label, although not treated in this manner, is prevented from curling back, being held under by the lapped end. By increasing or diminishing the spring pressure, the bar may be made to curve in this way the heaviest bronze label, or the lightest of the white labels, so that either takes the shape of the can, and requires very little paste to make a tight neat seam. If the bottom of the curling bar were a flat unbroken surface, it would not leave sufficient paste on the label, as too much would be scraped off the latter as it passed under the bar. By providing the grooves or notches, a sufficient amount of paste is allowed to pass under. Moreover, the bar constructed as it is with grooves, delivers the paste in ridges on the end of the labels, causing the lapped ends to hold more firmly, for reasons heretofore explained. Various forms of grooves or notches may be used successfully for the purpose mentioned, such as V-shaped inverted U, etc. The arms 97 being independently yielding, allow the curling rod 96 to adjust itself freely to the crosswise slant or incline of the labels, caused at times by embossing; and thus by an even pressure, to practically assure a uniform curl at either side of the label, and at the same time to avoid tearing of labels.

The functions performed by my label curling device are of the greatest of importance in the application of sized or heavy labels, and to properly perform its functions, the position, shape, and tension adjustment of the curling device are all important.

While the cans are are being propelled through the machine, the labels have a tendency to creep or slip on them, due to conveyer belts 8 drawing or pulling them through the machine. To prevent this creeping or slipping, which loosens the labels, a brush 102 is provided (see Figs. 2, 2ª) and placed in such a position as to work on the label. It will be noted in Fig. 2ª, that when the can is being propelled by the belts 8, that portion of the brush ahead or in front of the can is drawing or holding the label, while that portion of the brush at the rear is smoothing or spreading out the label. It is necessary to keep the label taut or tight before the lap end is sealed, for, if the label is seamed loosely, the fullness will remain, and in endeavoring to remove it, wrinkles are formed. The brush by being secured to the two movable shafts 17ª, has a vertical rocking movement, or rises and lowers at either end, by reason of the cans passing under these shafts, and undue friction as the can encounters and leaves the brush is thereby avoided. Brushes as heretofore used for this purpose have not proved successful, since they were so constructed and located as to come in contact with the label after the lap had been seamed, or were so arranged as to cause a loose or wrinkled label. It is by the action of this brush and the last set of rollers 17 (the seam of the label coming directly under these rolls, and the rear end of the brush), that the lap end of the label receives its primary seal, thus holding the label firmly on the can, until the latter has made one half revolution, bringing the lap end down on the second sealing device, to be explained. Another important feature of a brush, as a sealing means, is; should the lap end occur at the dented portion of a can, the brush follows into the dent whether it be large or small, thus forcing and causing the lap to be sealed satisfactorily on small or large indentations.

The next step in the operation of attaching the labels, consists in pasting the lap ends thereof. For this purpose, a pasting apparatus 103 is arranged contiguous to the rear end of the lable holder, as illustrated in Figs. 1 and 20. A paste holder or receptacle proper 103 is supported as shown in Figs. 25 and 26, by means of rods 104, attached to and pendent from the frame bars 1, and provided at their lower ends with vertically adjustable collars 105 having lugs that engage lugs 106 attached to the paste holder 103. The lugs (106) might be more properly termed plates extending along the sides of the paste receptacle or holder (103) and provided with longitudinal slots to receive thumb screws (107) which engage tapped holes in laterally extending plates mounted on the collars (105). Thumb screws 107 serve to secure the parts together as shown, and the collars being vertically adjustable on the rods 104, by means of set screws 108, the height of the paste holder 103 may be regulated as required. Within the paste holder 103, a pulley 109 is mounted on a shaft 110, which, as shown in Fig. 20, is geared with a driving shaft 111. A narrow eyeleted endless belt 112 runs on the sprocket 109, and is driven continuously thereby. This belt passes over idlers 113, these being small circumferentially grooved pulleys (Fig. 20) journaled in standards 114 (Fig. 26) bolted to the sides of the paste-holder 103. The belt runs in the direction indicated by arrows, (Fig. 26) and, since the lower portion of the pulley 109 is always immersed in paste, the belt continually takes up paste by adhesion, carries it up, and applies it to the label ends; that is to say, it constantly rubs the paste on the ends of the labels which project from the label holder proper as shown in Fig. 20. By causing the belt to run always in contact with the labels, the paste is rubbed into the pores of the labels, thus rendering a heavy varnished label soft and pliable before its lap end is closed down or seamed. It is to facilitate this rubbing, that the belt is made to run continuously instead of intermittently. The narrow belt now employed running crosswise, answers the same purpose as a broad belt arranged as in Patent No. 659,075, but the narrow belt is a simpler device and at the same time a less expensive and more effective one. The paste on the belt is on its inner side next to the label, and for this reason the belt running continuously on the labels would, except for provision to the contrary, cause a certain amount of paste to be wiped off onto the side of the pack of labels, thereby causing the labels to stick and the pack to be moved across the tops of the labels. To prevent this, we provide a metal plate 115, preferably brass, (see Figs. 26, 28 and 29). This plate extends between the tops of arms 114 (see Fig. 26) and is sustained by lugs 115$^a$ which take over the belt when the label plate 76 is lowered to refill the label holder. It is easily detachable from belt 112 for cleaning, since the lugs project inward but are not in contact with each other. The grooves in idlers 113 (Fig. 20) and those (see Fig. 29) formed at 115$^b$ in the ends of the plate 115, allow a full supply of paste to be taken up by the belt 114. Some of this paste, however, is liable to accumulate where the belt first meets the label pack, and to protect the latter at that point, we provide the plate 115 with a pendent guard 115$^c$ (see Figs. 26, 28) positioned between the right hand idler 113 and the adjacent corner of the label pack. A leaf spring 115$^e$, suitably attached to the frame of the machine, (see Figs. 20 and 26) bears upon the paste belt and holds it in contact with the labels. The plate 115 is provided with a lug or lateral projection 115$^d$ (see Figs. 28, 29) which, when the labels are exhausted, by coming in contact with standard 114, holds the plate 115 away from the idlers 113 against the action of the belt.

Unlike other machines, the whole of the rear pasting device proper is readily detachable, no one part being necessary to remain on the machine. This arrangement of paste belt and mechanism in one and a distinct form, is advantageous in cleaning same.

The quantity of paste taken up by the belt 112, is regulated to a nicety by means of a slotted guide 116 (see Figs. 20, 25, 26, 27) the same being a right angular plate secured to the edge of the paste-holder proper 103. Upon this plate 116 rests another right angular plate 117, which is also provided with a slot. The plate 117 is adapted to slide on the plate 116 and is adjustable thereon by means of a screw 118. By adjustment of the plate 117, the belt may be drawn more or less tightly against one edge of the slots in the respective plates, and any surplus paste thereby scraped off and conveyed back into the paste-holder 103. The grooves in the pulleys 113, permit a certain quantity of paste to pass with the belt, whereas, if the pulleys had a smooth periphery, more or less obstruction in this respect would occur. The belt line between the top pulleys is below the label line, so that when the label follower is raised the belt rises and adjusts itself to the label, always being in contact therewith.

The uppermost label having been pasted at its lap end by means of the belt 112, and drawn off over the curling rod 96 (see Fig. 20) the lap end is secured firmly and evenly by pressure applied by a pad 119 (see Figs. 30, 31). This pad is held removably in a box 119ª, supported upon a plate 119ᵇ, in turn mounted on a horizontal shaft 122 journaled in a yoke 122ª attached to and connecting the rear ends of plate springs 121, 121ª which act as a runway or tracks for the cans and are at their other end attached to the main frame of the machine. A spiral spring 123 is applied to the rock shaft 122 on the rear side of the yoke, in such manner as to hold the pad in frictional engagement with the yoke. In addition to the spring supports 121, we provide a spiral spring 120 applied to a screw threaded pin 125 on a fixed bracket 120ª. The spring rests upon jam nuts 124 which may be adjusted higher or lower on the pin 125 to vary the upward pressure on the plate 119ᵇ supporting the pad 119. In making the lap seam of the labels, it is essential to have all the pressure possible without denting the cans. The quality of the metal in cans varies considerably, some being made of heavy tin, others of very light metal. When heavy tins are being labeled, the coil spring 120 is raised by adjusting the lock nuts 124. Lighter or thinner tins when passing over the seaming pad, having the same tension would be dented by this spring pressure, and in such case by lowering the nuts 124, the resistance of the seaming pad is diminished. The pad is made removable, whereby it is easily cleaned, so as to avoid soiling or discoloring of delicate white labels. It may also be reversed when worn on one side. It is made of alternate layers of soft sponge rubber and felt, covered with a sheet of soft rubber, and is thus soft enough to press the lap end of the label into any dents or irregularities in the surface of the cans. The swiveled or pivotal arrangement of the pad-supporting plate 119ᵇ further assists in this operation, since it allows the cushion to rock and conform more perfectly to the peripheral contour of the can. From the pad 119, the cans pass, with the labels applied smoothly and tightly thereto from the machine on a suitable chute 126 (see Fig. 1).

Having thus described our invention, what we claim and desire to secure by Letters Patent is:—

1. In a labeling machine, a runway having guide rails along either side thereof for substantially its entire length, yieldable supporting means for one of the rails and said yieldably supported rail being flexible laterally and substantially fixed against longitudinal movement.

2. In a labeling machine, a runway having guide rails along either side thereof, one of said rails being fixed and the other of said rails being flexible at substantially every point of the runway, and yieldable means for moving said rails toward one another.

3. In a labeling machine, a runway having guide rails along either side thereof, one of the rails comprising sections joined together to form a continuous rail, and yielding means for urging such sections toward the opposite rail.

4. In a labeling machine, a runway having guide rails along either side thereof, one of said rails comprising sections joined together to form a continuous rail and a yielding means for urging a plurality of such sections toward the opposite rail.

5. In a labeling machine, a runway having guide rails along either side thereof one of the rails being continuous and elastic throughout its entire length, and having means whereby it is divided into a set of flexibly connected sections.

6. In a labeling machine, a runway having a fixed side guide, comprising an elastic continuous member and support therefor, the front end of the member extending beyond the support nearest the front of the runway, and a spring attached to a fixed part in front of the runway and extending into the latter, and loosely connected with the free front end of the movable side guide.

7. In a labeling machine, a runway having a yielding guide with a freely yielding end, a feedway to said runway and a flexible connection from the feedway to the front end of the yielding guide.

8. In a labeling machine, a runway having a yielding guide with a freely yielding end, a feedway to said runway and an adjustable connection from the feedway to the free end of the yielding guide.

9. In a labeling machine, a runway having a yielding guide with a freely yielding end, a feedway to said runway, and a connection from the feedway to the free end of the yielding guide.

10. In a labeling machine, a runway, means for applying paste to articles on the runway and means for removing all of the paste from a portion of said means so as to apply the paste on the article in the form of protuberances thereon.

11. In a labeling machine, a runway, a label holder adjacent the runway, comprising a base and side pieces, a means for simultaneously moving the side pieces to change their relative position and means for simultaneously moving the same side pieces without changing their relative position.

12. In a labeling machine, a runway, a label holder adjacent the runway, comprising a base and side pieces, means for changing the relative position of the side pieces, and means for simultaneously moving the same side pieces without changing their relative position.

13. In a labeling machine, a runway, a label holder adjacent the runway, comprising a base plate and laterally adjustable vertical side pieces, a follower or label bed comprising a central portion and plates which are slidable on the base plate and connected with the side pieces, so that as the latter are adjusted relatively the plates are moved laterally.

14. In a labeling machine, a runway, a label holder adjacent the runway, comprising a base plate, vertically adjustable side pieces having vertical dove-tailed grooves in their inner sides, a label follower, a means for adjusting the same vertically, such follower comprising a plurality of slidable plates having lateral projections provided with enlarged heads fitted to slide within the grooves in the side pieces and to serve as a positive connection between said plates and side pieces while permitting vertical adjustment of the plates in accordance with the thickness of the label packed thereon.

15. In a labeling machine, a runway, a label holder adjacent the runway, comprising a base and side pieces extending longitudinally of the machine, a means for adjusting the angularity of the side pieces with respect to each other.

16. In a labeling machine, a runway, a label holder adjacent thereto comprising a base and side pieces extending longitudinally of the machine, means for adjusting the angularity of said side pieces with respect to each other, and means for moving the base between the side pieces.

17. In a labeling machine, a runway, a label holder adjacent the runway comprising a horizontal base plate, vertical side pieces having laterally projecting arms and guides in which such arms are adapted to slide, one of the guides being of a shape to allow a play or relative movement of the arm therein and a pivot at an intermediate point of one of the side pieces to provide for such play or relative movement of the arm in its guide, means for adjusting the side pieces toward and from each other, and means for clamping the same in any desired adjusted position.

18. In a labeling machine, a runway, a label holder adjacent thereto comprising a base and side pieces extending longitudinally of the machine, a pivot on which one of the side pieces is angularly adjustable, and means for adjusting the position of such pivot on its support.

19. In a labeling machine, a runway, a label holder adjacent thereto having a base and side pieces slotted vertically, and a label-retaining device slidably mounted in the slots and bearing by force of gravity on the labels.

20. In a labeling machine, a runway, a label holder adjacent thereto having a base and side pieces, a yielding label retaining device having laterally extending arms to engage the labels extending over the label holder from one of the side pieces to the other at points thereof intermediate the ends of the labels in the holder.

21. In a labeling machine, a label holder, comprising a base and side pieces and a yielding knife edge having a substantially vertical traverse carried by one of the side pieces for pressing upon and separating the labels within the holder and means for limiting the extent of incision of said knife in the labels.

22. In a labeling machine, a label holder, comprising a base and side pieces and a spring depressed knife edge having a substantially vertical traverse carried by one of the side pieces for separating the labels within the holder and means for limiting the extent of incision of said knife in the labels.

23. In a labeling machine, a label holder comprising a base and side pieces, a lever pivotally mounted to swing vertically on one of the said side pieces, a slot in said lever, a pin in said slot limiting the motion of the lever a knife edge carried by the lever engaging the labels in the holder, and means for maintaining the knife edge in engagement with the labels.

24. In a labeling machine, a label holder, comprising a base and side pieces, and a label curling device across the top of the label holder in such a position as to curl the labels as they are drawn from the holder, the surface of the curling device, which comes in contact with the label being grooved.

25. In a labeling machine, a label holder, comprising a base and side pieces, and a yielding label curling device across the top of the label holder in such a position as to curl the labels as they are drawn from the holder, the surface of the curling device, which contacts with the label, having grooves which extend in the direction of the circumference of the package to be labeled.

26. In a labeling machine, a label holder and means for continuously applying paste to the lap ends of the labels in the holder, consisting of a belt running over grooved pulleys and adapted to carry paste, the pulleys being adapted to form the paste on the belt into protuberances.

27. In a labeling machine, a label holder, a paste holder, means for continuously feeding paste from the paste holder to the lap ends of the labels in the label holder and means consisting of a plate supported by the belt and having an extension interposed between the belt and the side of the label pack for preventing access of paste to the latter from the belt.

28. In a labeling machine, a label holder, a paste holder, a belt passing through the paste holder and over the lap ends of the label pack in the label holder, and means interposed between the belt and the side of the label pack for preventing access of surplus paste to the latter from the belt.

29. In a labeling machine, a label holder, a paste holder, a belt passing through the paste in the paste holder and against the labels in the label holder, and means for regulating the quantity of paste carried by the belt and grooved rollers for guiding the belt, by means of which the paste is caused to be formed into protuberances.

30. In a labeling machine, a runway, means adjacent the runway for pasting labels to articles thereon, and an elastic pad onto which the articles are discharged from the runway, and means whereby the pad is made to yield longitudinally and transversely to the path of the runway, whereby the lap ends of the labels are evenly pressed on to the articles.

31. In a labeling machine, a runway, means adjacent the runway for pasting articles thereon, and a pad attached to the runway by means of a spring adapted to yield longitudinally of the runway, and onto which the articles are discharged from the runway, the pad being mounted to move transversely to the runway, whereby the labels are evenly pressed on to the articles.

32. In a labeling machine, a runway, means adjacent the runway for pasting labels to the articles thereon, a pad attached to the runway by means of a spring adapted to yield longitudinally of the runway, and on to which the articles are discharged from the runway, and a vertically yielding spring on which said pad is mounted to provide for yielding engagement of the pad with the articles discharged thereon, whereby the labels will be evenly pressed on to the articles.

33. In a labeling machine, labeling instrumentalities, a runway, a belt for feeding cans along the runway, guide rollers for the belt, said rollers having their belt engaging faces slightly inside of the path of the can flanges and beveled to allow the belt to be pressed against the body of the can without injuring the flanges thereof.

34. In a labeling machine, a label holder, comprising a base and side pieces, a bar across the holder above the labels to curl the same as they are drawn from the holder, such bar being grooved transversely to provide for the passage therethrough of the paste on the labels as the latter are drawn from under the bar.

35. In a labeling machine, a runway, a label holder adjacent the runway, means for applying paste to the articles to cause them to engage a label as they pass over the label holder, and a brush in the path of the articles beyond the label holder, the brush being mounted resiliently at either end thereof to rock in the plane of the runway, whereby when the article reaches the brush the label attached thereto is first smoothed out by engagement with the yielding forward end of the brush and then has its lap end securely pasted down by engagement with the yielding rear end of the brush.

36. In a labeling machine, labeling instrumentalities, a runway, a belt for feeding articles along the runway, rollers for guiding said belt, the belt engaging surface of the rollers being laterally disposed with respect to the belt engaging surface of the articles, whereby a direct pressure of the rollers on the articles is avoided.

37. In a labeling machine, labeling instrumentalities, a runway, a belt for feeding articles along the runway, means for guiding the belt and maintaining it in contact with the articles, and means for adjusting said guiding means laterally to vary the pressure of the belt on the articles.

38. In a labeling machine, a runway including side guides one of which comprises a substantially continuous elastic member, and suitable supports therefor, substantially as described.

39. In a labeling machine, labeling instrumentalities, a runway including side guides, one of which comprises a substantially continuous tubular member yieldingly mounted on spring supports, so that the guide may frictionally engage the package at all points of the runway, and conform to variations as to size of the packages.

40. In a labeling machine, labeling instrumentalities, a runway including a fixed side guide, and a parallel movable side guide formed of a continuous elastic member, and suitable supports therefor, substantially as described.

41. In a labeling machine, labeling instrumentalities, a runway including side guides one of which comprises a continuous member formed of spiral spring wire, and supports therefor, substantially as described.

42. In a labeling machine, labeling instrumentalities, a runway including side guides, one of which is movable laterally and comprises a wire coil, and spring supports therefor adapted to yield in the manner described.

43. In a labeling machine, labeling instrumentalities, a runway comprising side guides one of which is formed of a spring wire coil extending the length of the runway, sleeves applied thereto, and supports for such member, substantially as described.

44. In a labeling machine, labeling instrumentalities, a runway, including side guides one of which is fixed, and a laterally yielding guide comprising a spring wire coil, a series of cylindrical sleeves applied thereto and incasing it, and supports connecting with the coil intermediately of the sleeves, substantially as described.

45. In a labeling machine, labeling instrumentalities, a runway including a fixed side guide and a laterally movable side guide, comprising a continuous spring wire coil extending the length of the runway, a series of cylindrical tubes applied to and incasing the coil, and springs connected with the movable guide and supporting the same, said springs being attached to a fixed portion of the frame of the machine, substantially as described.

46. In a labeling machine, labeling instrumentalities, a runway including side guides one of which is movable laterally and comprises a horizontal member with supports therefor, and a series of sleeves in cylindrical form which are applied to said movable guide and adapted to rotate thereon, substantially as described.

47. In a labeling machine, labeling instrumentalities, a runway, comprising side guides, one of which is yielding, and a chute for delivering cylindrical articles to said runway, an adjustable guide strip extending between the chute and the runway, and connected with the chute and the yielding side guide, substantially as described.

48. In a labeling machine the combination with labeling instrumentalities, of a runway including side guides one of which is movable, and a chute for delivering cylindrical articles to the runway, of a side guide comprising a plate spring attached to the chute and extending forward and connected with the front end of the movable side guide, and means for adjusting said spring inward at an inclination to the direction of the runway, substantially as described.

49. In a labeling machine the combination with labeling instrumentalities, of a side guide comprising an elastic continuous member and supports therefor, the front end of said member extending beyond the support nearest the front end of the runway, and a spring attached to a fixed part of the machine in front of the runway and extending into the latter and loosely connected with the free front end of the movable side guide, substantially as described.

50. In a labeling machine, labeling instrumentalities, a runway having side guides and endless traveling belts running at reverse angles and arranged over the same and sets of rolls arranged horizontally and adapted to press upon the belts, the first set being arranged to work in contact with the outer edges of the belts for canting them at an angle to the cans, and the second set being placed nearer each other and working in contact with the belts near their inner edges, and the third set of rolls arranged to press the inner edges of the belts upon the can, substantially as set forth.

51. In a labeling machine, the combination with a runway including side guides, labeling instrumentalities, and paste-applying devices, of endless traveling feed belts arranged above the runway and belt depressing rolls arranged over the belts and having faces that run in contact with the same and extend lower than the highest point of the cans passing so that at some of the rollers the inner sides of the belts are left free and work in elastic yet firm contact with the can flanges or heads, and at others the outer side of the belt is free, and engages the flange, while the inner side is pressed by the roll against the cylindrical surface of the can, substantially as described.

52. In a labeling machine the combination with a can runway including side guides and paste-applying devices, of labeling instrumentalities, endless traveling belts for feeding cans or other cylindrical articles through the runway, rolls arranged above said belts and spaced apart a greater distance than the length of the cans, a horizontal shaft on which said rolls are mounted, some of the latter being of such dimension and so arranged that their peripheries extend downward and depress the outer edges of the belts below their normal level, the inner edges of the belts being left entirely free for working in contact with the can flanges or heads at a lateral angle thereto, while others are so placed as to depress the inner edges of the belt, and bring them in contact with the cylindrical surface of the can leaving the outer edge free, substantially as described.

53. In a labeling machine, a paste holder formed of two parts, namely, a paste holder proper, having an open bottom and a paste supply device below the bottom forming a closure for the opening, and means for varying the capacity of the supply device so as to force the paste into the holder, substantially as described.

54. In a labeling machine, the combination, with a paste-holder proper having an open bottom, and a pendent circular boss attached to the part surrounding the opening and provided with bayonet slots, of a paste-supply device comprising a cylinder which is open at the upper end and provided with pins adapted to engage the bayonet slots, and a piston which is slidable in the cylinder and provided with a rod extending through bottom thereof, substantially as described.

55. In a labeling machine, the combination, with a paste-holder proper having an open bottom, of a paste-supply device comprising a receptacle, a piston slidable therein, and a rod attached thereto and project- 56. In a labeling machine, the combination, with a paste-holder proper having an open bottom, of a paste-supply device which is adapted for detachable engagement with the holder, and a support for such paste-supply device, while the latter is being filled, on the main frame of the machine in vertical alinement with the opening in the paste-holder, substantially as described.

57. In a labeling machine, the combination, with the paste-holder proper having an opening in the bottom, of a paste-supply device comprising a receptacle which is open at the upper end and means for securing the receptacle to the holder, a piston slidable in the receptacle and having a rod projecting therefrom, and a catch adapted to engage and lock the piston rod when adjusted at different heights, substantially as described.

58. In a labeling machine, the combination, with the paste-holder proper, a roller adapted to revolve therein for applying paste to a can, and a scraper having a corrugated edge arranged contiguous to the roller, a gage plate applied to the scraper and adapted for adjustment toward and from the edge thereof, and means for clamping it in any adjustment, substantially as described.

59. In a labeling-machine the combination with a frame and a runway of a paste receptacle arranged beneath the runway and means for supporting said receptacle, comprising a notched extension thereof at one end, a coöperating adjustable member, an extension on the end of the receptacle, bolts supported on the frame engaging said extension and wedges adjustably supporting said bolts.

60. In a labeling machine, the combination, with the main frame having a runway, of a paste-holder and means for detachably engaging and supporting it on one side, lateral projections from the opposite side having headed bolts or pins projecting upward and adapted to pass through holes in the frame, and slides applied on such portion of the frame and provided with slots and having a slotted end beveled for wedging the heads of the posts, and nuts for clamping such slides, substantially as described.

61. In a labeling machine, the combination, with a main frame having a runway, of a paste-holder, a roller adapted to rotate therein and work in contact with cans passing through the runway, and a device adapted to stir the paste and push it on to the roller, the same consisting of a rotary shaft arranged in the paste-holder parallel to the roller, arms projecting radially from such shaft, and plates attached thereto and arranged parallel to the shaft and made convex on their outer sides, substantially as described.

62. In a labeling machine, the combination, with the main frame and a runway formed therein, of a label holder arranged below the runway, and comprising a base plate, vertical side guides, means for adjusting such guides toward and from each other individually, so that they may be set at different distances apart, means for adjusting such side guides bodily together, so that they may be shifted laterally relative to the runway without changing the distance between them, and a vertically adjustable follower, or label bed, arranged between such side guides, substantially as described.

63. In a labeling machine, the combination, with the main frame, and a runway arranged therein, a label holder comprising a horizontal base plate, vertical side guides arranged slidably on the base plate, and means for adjusting them toward or from each other, the same comprising a shaft having right and left screw threads, arms pendent from the side guides and having screw threaded bearings corresponding to the threads on the shaft, and a support for such shaft which is pendent from the base plate and wherein the shaft is slidable, substantially as described.

64. In a labeling machine, the combination, with the main frame, and a runway arranged therein, of a label holder arranged below the runway and comprising a horizontal base plate, vertical side guides having lateral arms, guides on the base plate between which such arms are held slidably, means for clamping the arms in any required adjustment, and means for adjusting the side guides laterally, substantially as described.

65. In a labeling machine, the combination, with the main frame having a runway therein, of the label holder comprising a horizontal base plate, vertical side guides which are slidable thereon, means for adjusting them toward and from each other individually, and means for adjusting them together without changing the distance between them, the same comprising a horizontal shaft having a screw threaded portion, bearings connected with the base plate in which such shaft is adapted to work, and a device attached to said shaft and engaging the means for adjusting the side guides toward and from each other, substantially as described.

66. In a labeling machine, the combination, with the main frame having a runway therein, of a label holder comprising a base plate, vertical side guides, a rotary shaft having right and left screw threads, and adapted to slide in gearings pendent from the base plate, arms pendent from the side guides and having threaded bearings for the threaded portions of the said shaft, whereby the side guides may be adjusted toward and from each other, and the means for shifting the said shaft endwise and thus shifting the side guides together laterally, the same comprising a rotary shaft arranged parallel to the first-named shaft and having a threaded portion, bearings pendent from the base plate, one of them being threaded corresponding to the last-named shaft, and an arm journaled on the latter shaft and engaging the first-named shaft, substantially as described.

67. In a labeling machine, the combination, with the main frame having a runway therein, of a label-holder comprising a base plate, vertical side guides which are adjustable laterally, a spring supported follower or label bed comprising a central portion, plates which are slidable on the central portion and connected with the side guides so that when the latter are adjusted from each other, the said plates are drawn bodily laterally, substantially as described.

68. In a labeling machine, the combination, with the main frame having a runway therein, of a label holder comprising a horizontal base plate, vertical side guides, and a vertically adjustable follower or label bed including two plates which are slidable laterally, the same being connected with the side guides by positive means, so that when the latter are adjusted from each other, the said plates follow and thus remain in closed relation to such guides, substantially as described.

69. In a labeling machine, the combination, with the main frame having a runway therein, of a label holder comprising a base plate, vertically adustable side guides having vertical dove-tail grooves in their inner sides, a label follower, and means for adjusting the same vertically, such follower comprising a central plate and two slidable side plates having lateral projections provided with enlarged heads adapted to slide vertically in the said grooves and thus serve as a positive connection between the said plates and side guides while permitting vertical adjustment of the plates corresponding to the thickness of the label pack supported thereon, substantially as described.

70. In a labeling machine, the combination, with the main frame having a runway therein, of a label holder comprising a base plate, vertical side plates which are adjustable toward and from each other, means for effecting such adjustment, and a label follower, and means for adjusting the same vertically, such follower comprising plates which are slidable on each other, means for connecting such plates with the side guides whereby the plates follow the guides when adjusted apart, and means for guiding and clamping the plates to each other, substantially as described.

71. In a labeling machine, the combination, with the main frame having a runway therein, of a label holder comprising a horizontal base plate, vertical side guides having laterally projecting arms, and parallel guideways in which such arms are adapted to slide, the arms of one side guide being tapered to allow a certain play or freedom of movement of the same relative to the guides, such side guide being pivoted centrally, means for clamping such side guide in any required position, and means for adjusting the side guides toward and from each other, substantially as described.

72. In a labeling machine, the combination, with the main frame having a runway therein, a label holder comprising a base plate, side guides which are adjustable toward and from each other and one of them pivoted as described, of means for adjusting the side guides toward and from each other, and a label follower comprising a central plate having central slots and two side plates which are adapted to slide thereon, screws passing through the slots of the central plate and connected with the slidable plates, and means for positively connecting the slidable side plates with the side guides, substantially as described.

73. In a label machine, the combination, with a main frame having a runway therein, of a label holder comprising a base plate, side guides having slots in their upper edges, and near their rear ends, and a label-weighting device extending between the side guides and having portions adapted for free vertical movement in such slots, substantially as described.

74. In a label machine, the combination, with a main frame having a runway therein, of a label holder comprising a base plate, vertical side guides having slots in their upper portions near their rear ends, and a label-weighting device consisting of a bar having a cruciform shape, the same being loosely mounted in the slots of the side guides whereby it is adapted for vertical play, substantially as described.

75. In a label machine, the combination, with a main frame having a runway therein, a label holder comprising a base plate, vertical side guides having vertical slots in their upper edges, of a label curling device consisting of a bar extending between the guides and adapted to work vertically in the said slots, side levers to which it is permanently connected, the same being pivoted to the side guides, and springs bearing thereon, and means for adjusting their pressure, substantially as described.

76. In a label machine, the combination, with a main frame having a runway therein, a label holder comprising a base plate, side guides having vertical slots in their upper edges and near their rear ends, and a vertically adjustable follower, of a label curling device consisting of a bar extending between the label guides and having its under side flat and its front edge rounded, substantially as described.

77. In a label machine, the combination, with a main frame having a runway therein, a label holder comprising a base plate, side guides having guideways on their upper edges and near their front ends, and a label follower, of a label curling device consisting of a bar extending across the side guides and engaging the guideways thereon, and means for applying elastic downward pressure thereto, substantially as described.

78. In a labeling machine, the combination, with the main frame having a can runway therein, a label holder comprising a horizontal base plate, vertical side guides and a label follower arranged between them, of label holders proper comprising two fixed and two vertically movable devices which project inward from the sides of the side guides, the vertically movable ones being adapted to work in slots in the side guides, substantially as described.

79. In a labeling machine, the combination, with the main frame, having a runway therein, of a label holder comprising a base plate, a label follower and vertical side guides having devices for pressing upon the labels, the same comprising two fixed knife-like blades and two similar movable blades, pivoted levers to which the movable blades are attached, and springs for pressing upon said levers, substantially as described.

80. In a labeling machine, the combination, with a main frame having a runway therein, of the label holder comprising a base plate, vertical side guides and means for pressing upon the side edges of the labels, and a device for pressing upon the front edge of the labels, the same being arranged midway between the side guides and consisting of a knife-like blade which is beveled on its under side at the front end, as shown and described.

81. In a labeling machine, the combination, with the main frame, having a runway therein, and a label holder including a vertically adjustable follower, of means for applying paste to the lap ends of the labels, the same comprising a paste holder supported below the runway, a constantly running driving pulley arranged in the paste holder, idler pulleys arranged above the same and provided with circumferential grooves, and a belt running on the three pulleys and arranged to pass transversely over the ends of the labels, substantially as described.

82. In a labeling machine, the combination, with the main frame, having a runway therein, and a label holder including a follower which is vertically adjustable, of means for applying paste to the lap ends of the labels, the same comprising a paste holder, a pulley arranged therein, idler pulleys arranged above the same adjacent to the lower side of the runway, an endless belt arranged on such pulley and adapted to run transversely across the ends of the labels, and a plate in engagement with such transverse portion of the belt and having a pendent portion which is interposed between the first idler and the label pack, to prevent access of surplus paste to the latter, substantially as described.

83. In a labeling machine, the combination, with the main frame, having a runway therein, and a label holder including a follower which is vertically adjustable, of means for applying paste to the lap ends of the labels, the same comprising a paste holder, a pulley arranged therein, idler pulleys arranged above the same adjacent to the lower side of the runway, an endless belt arranged on such pulley and adapted to run transversely across the ends of the labels, and a belt attachment arranged between the idlers, the same comprising a plate having a lengthwise slot and lateral projections extending inward but separated from each other, so that the plate may be quickly applied to and removed from the belt, substantially as described.

84. In a labeling machine, the combination, with the main frame having a runway therein, of means for applying paste to the lap ends of the labels, the same comprising a paste holder, an endless belt running therein and across the ends of the labels, idler pulleys over which the upper portion of the belt runs, the same being provided with circumferential grooves, and a label guard comprising a slotted plate arranged between the idlers and having a pendent portion that protects the side edges of the labels from access of surplus paste, the said plate having an adjacent end portion provided with grooves, substantially as described.

85. In a labeling machine, the combination, with the main frame, having a runway therein and a label holder, and means for continuously applying paste to the lap ends of the labels, the same comprising a paste holder proper, an endless belt running therein and its upper portion extending transversely across the ends of the label pack, idler pulleys over which the upper portion of the belt runs, and a label guard interposed between the label pack and one of said pulleys to prevent access of surplus paste to the pack, substantially as described.

86. In a labeling machine, the combination, with the main frame having a runway therein, and a label holder having a label follower, of means for applying paste, the same consisting of a paste holder proper supported below the runway, a pulley arranged in the paste holder and guide pulleys arranged above the latter, a belt running on the said pulleys, so as to pass transversely of the runway, and means for regulating the quantity of paste carried up by the belt, the same consisting of a slotted plate and a slotted gage plate applied thereto, and means for adjusting the gage plate, substantially as described.

87. In a labeling machine, the combination, with the main frame having pendent rods, and collars which are vertically adjustable thereon and provided with lateral ears, of a paste-applying mechanism comprising a paste holder and pulleys and a belt traveling thereon, the paste holder proper having lateral projections adapted to rest upon the ears of said collars, and means for clamping the two parts detachably together, substantially as described.

88. In a labeling machine, the combination, with the main frame having a runway therein, the ends of the runway being extended to form spring arms at the rear extremity of the runway, a label holder and means for pasting the lap end of the label, of means for pressing such lap end upon the package, the same consisting of a pad mounted on the said spring arm, substantially as described.

89. In a labeling machine the combination with the can frame, having a can runway therein, the runway being extended at the rear to form spring arms, and a label holder and means for applying paste to the lap ends of the labels, means for pressing such lap ends upon the cans, the same consisting of a device over which the can with its attached label is adapted to pass, such device being mounted on the said spring arms to yield vertically, and pivoted to rock transversely of the path of the can, substantially as described.

90. In a labeling machine, the combination, with the main frame, having a can runway therein, a label holder and means for applying paste to the lap ends of the labels, of means for pressing such lap ends upon the cans, the same comprising a pad mounted upon a central horizontal rock shaft, and means for supporting the pad elastically, substantially as described.

91. In a labeling machine, the combination, with the main frame having a can runway therein, a label holder, and means for applying paste to the lap ends of the labels, of a label-pressing device located at the end of the runway, and comprising a pad, springs for supporting the pad elastically, the pad having a pivotal connection therewith, and a second spring arranged to press against the central under portion of the pad support, substantially as described.

92. In a labeling machine, the combination, with the main frame having a can runway therein, a label holder and means for applying paste to the lap ends of the labels, of means for pressing down the lap end of the label, the same comprising an elastic pad which is elastically supported and adapted to rock transversely and a holder for the pad from which it is detachable, substantially as described.

93. In a labeling machine, the combination, with the main frame having a can runway therein, a spring extension to said runway, and means for applying paste to the lap ends of the label, of means for pressing such label ends upon the can, the same comprising an elastic pad mounted on said extension, a second spring support for the pad, and means for adjusting the tension of the second spring support, substantially as described.

94. In a labeling machine, the combination, with the main frame having a can runway therein, and means for applying paste to the lap ends of the labels, of means for pressing such lap ends upon the cans, the same comprising a pad, a spring support therefor, a rock shaft upon which the pad support is mounted and a spring applied to such rock shaft for holding the pad support in frictional engagement with the bearing of the rock shaft, substantially as described.

95. In a labeling machine, the combination, with the main frame a can runway therein, and side guides for such runway, labeling instrumentalities, endless feed belts adapted to run in contact with the cans driving an idler wheel upon which the belts run, the driving wheels being spaced apart, and a belt tightener comprising an arm pivoted between the driving wheels and carrying idlers adapted to press and run upon the belts, the said arm being adapted to be turned back of the belts and swung downward between the driving wheels, substantially as described.

96. In a labeling machine, a run way for the cans, means for advancing the cans along the run way, a label holder adjacent the run way, means for positively curling a substantial portion of each label, and means for applying paste to the lap ends of the label.

97. In a can labeling machine, means for pasting the main body of the label to the can, means adapted to engage the label at a point intermediate its ends for curling the lap ends of the label, and other means for applying paste to the lap ends.

98. In a can labeling machine, a runway for cans, a label holder adjacent the runway, means for advancing the cans along the runway, means for applying paste to the main body of the labels and to the lap ends, and means for curling the labels consisting of a yielding member extending across the label holder to bear on the labels at a point slightly spaced from the other ends of the labels.

99. In a can labeling machine having a runway, labeling instrumentalities, two endless conveyer belts located above the runway, parallel thereto and on each side thereof at a distance therefrom less than the diameter of the can and spaced apart a distance slightly less than the length of the can, mechanism for driving the same, and abutments located above the conveyer belts and at a distance from the runway about equal to the diameter of the can and spaced apart a distance somewhat greater than the length of the can but less than the distance between the outside edges of the belt.

100. In a can labeling machine, a runway, labeling instrumentalities, an endless conveyer belt located above the runway and parallel thereto at a distance therefrom less than the diameter of the can, mechanism for driving same, and abutments located above the belt and at a distance from the runway somewhat less than the diameter of the can and spaced apart a distance somewhat greater than the length of the can but less than the distance between the outside edges of the belt.

101. In a labeling machine, can feeding instrumentalities, pasting mechanism, a label holder adjacent said instrumentalities, a bar having a flat surface adapted to rest upon each label whereby the end of the label is curled.

102. In a labeling machine, can feeding instrumentalities, pasting mechanism, a label holder adjacent said instrumentalities, a bar having a substantially flat surface adapted to rest upon each label at a point removed from the ends thereof, whereby the label is curled.

103. In a labeling machine, can feeding instrumentalities, pasting mechanism, a label holder adjacent said instrumentalities, movably mounted means adapted to engage over each label whereby the label is curled.

104. In a labeling machine, can feeding instrumentalities, pasting mechanism, a label holder adjacent said instrumentalities, a spring pressed movably mounted means adapted to engage each label to curl the end thereof.

105. In a labeling machine, can feeding instrumentalities, pasting mechanism, a label holder adjacent said instrumentalities, and pivotally mounted means arranged above the label and adapted to contact therewith for curling the end thereof.

106. In a labeling machine, can feeding instrumentalities, pasting mechanism, a label holder adjacent said instrumentalities, spring pressed pivotally mounted means for engaging one surface of the label whereby the end of the same is curled.

107. In a labeling machine, can feeding instrumentalities, pasting mechanism, a label holder adjacent said instrumentalities, an adjustable rod arranged to engage the labels at a point intermediate their ends, whereby each label is curled.

108. In a labeling machine, can feeding instrumentalities, pasting mechanism, a label holder adjacent said instrumentalities, means for curling the ends of each label comprising a rod, pivotally supported adjacent opposite ends at a point intermediate the labels.

109. In a labeling machine, can feeding instrumentalities, pasting mechanism, a label holder adjacent said instrumentalities, means for curling the ends of each label comprising a rod, pivotally supported adjacent opposite ends at a point intermediate the labels, and a spring for normally holding the rod in one of its positions of adjustment.

110. In a labeling machine, a runway having oppositely disposed continuous guide rails, labeling instrumentalities, one or the other of which guide rails is yieldable at substantially every point of the runway.

111. In a labeling machine, labeling instrumentalities, a runway having oppositely disposed continuous guide rails, one of which rails is formed in sections substantially throughout, and each of said sections being yieldable.

112. In a can labeling machine, labeling instrumentalities and a can runway including a continuous flexible guide rail automatically yieldable so as to frictionally engage the can at all points of the runway.

113. In a labeling machine, the combination with the main frame having a runway therein, and a label holder including a vertically adjustable follower, of means for applying paste to the lap ends of the labels, the same comprising a paste holder supported below the runway, a driving pulley arranged in the paste holder, idler pulleys arranged above the same and provided with circumferential grooves, a belt running on the three pulleys and arranged to pass transversely over the ends of the labels, a shaft for the driving pulley projecting without the wall of the paste holder, and means for imparting continuous movement to said shaft including a transverse shaft and an interposed gear connection between the respective shafts.

114. In a labeling machine, a runway or support for cans or the like, a label support adjacent the runway, a paste carrying member adapted to move into contact with an exposed surface of a label mounted on the support, and a paste guard for the edge of the label.

115. In a labeling machine, a runway or support for cans or the like, a label support adjacent the runway, a paste carrying member adapted to move into contact with an exposed surface of the outermost label of a series mounted on said support, and means associated with said member for preventing the application of paste to the other labels of the series.

116. In a labeling machine, a runway or support for cans or the like, a label support adjacent the runway, a paste carrying member adapted to move into contact with an exposed surface of the outermost label of a series mounted on said support, and a paste guard for the edge of the labels.

117. In a labeling machine, a runway for cans or the like and labeling and pasting mechanism including a label support, a paste carrying member adapted to move into contact with an exposed surface of the outermost label of a series mounted on said support, and a paste guard mounted upon the pasting member and adapted to protect the edge of the labels from the paste.

118. In a labeling machine, a runway for cans or the like and labeling and pasting mechanism including a label support, a paste carrying member adapted to move into contact with an exposed surface of the outermost label of a series mounted on said support, and means adapted to engage the edge of the labels to prevent the application of paste thereto.

119. In a labeling machine, a runway for cans or the like and labeling and pasting mechanism including a label support, a paste carrying member adapted to move into contact with an exposed surface of the outermost label of a series mounted on said support, and protecting means mounted upon the pasting member and arranged to contact with the edge of the labels at a point adjacent said member.

120. In a labeling machine, the combination of a runway for cans or the like and labeling and pasting mechanism including a label support, a paste carrying belt adapted to play over a surface of a label on the support, and a label paste guard mounted on the paste carrying member, said guard having a flange adapted to engage the edge of the labels.

121. In a labeling machine, the combination of a runway for cans or the like and labeling and pasting mechanism including a label support, a paste receptacle, a belt adapted to supply paste from said receptacle to one surface of the labels mounted on the support, and a paste scraper mounted on said belt.

122. In a labeling machine, the combination of a runway for cans or the like and labeling and pasting mechanism including a label support, a paste receptacle, a belt adapted to supply paste from said receptacle to one surface of the labels mounted on the support, and a paste guard adjustably mounted on the belt.

123. In a labeling machine, the combination of a belt support, a runway for cans or the like and labeling and pasting mechanism including a paste receptacle, a belt adapted to supply paste from the receptacle to a label positioned on the support, and a paste guard slidably mounted on the belt.

124. In a labeling machine, the combination of a label support, a runway for cans or the like and labeling and pasting mechanism including a paste receptacle, a belt adapted to supply paste from the receptacle to a label positioned on the support, and a paste guard slidably mounted on the belt, said guard having a part engaging over the top of the labels and a part engaging over the edge of the labels.

125. In a labeling machine, the combination of a label support, a runway for cans or the like and labeling and pasting mechanism including a paste receptacle, a paste carrying member adapted to move in contact with one surface of the labels, and means for preventing the dropping of paste from said carrier into contact with the edge of the labels.

126. In a labeling machine, the combination of a label support, a runway for cans or the like and labeling and pasting mechanism including a paste carrying member adapted to move over the surface of the labels on said support, a label guard mounted on the paste carrying member, said guard having a paste receiving groove in that surface in contact with the paste carrying member.

127. In a labeling machine, the combination of a label support, a runway for cans or the like and labeling and pasting mechanism including a paste carrying member adapted to move over the surface of the labels on said support, a label guard mounted on the paste carrying member, said guard having a plurality of longitudinally extended paste receiving grooves in that surface in contact with the paste carrying member.

128. In a labeling machine, a runway for cans or the like and labeling and pasting mechanism including a label holder, a paste holder, a belt adapted to supply paste to a surface of the label mounted on the holder, and means for regulating the quantity of paste carried by the belt, said means constituting a protecting agent for the edge of the labels.

129. In a labeling machine, labeling instrumentalities, a runway, means for imparting rotary movement to cans or the like along the runway, and guide rails along either side of the runway below the center of the cans, one of said rails being substantially round in cross section and flexible, at substantially every point of the runway.

130. In a labeling machine for cylindrical packages, the combination of a runway, labeling instrumentalities, guide rails for the runway for substantially the entire length thereof, one of the rails being flexible, yieldable supporting means for said flexible rails, and means independent of said rails for imparting movement to the cylindrical package along the runway.

Signed by us at Westminster this 9th day of January, 1907.

WM. H. LEISTER.
HOWARD F. SCHAEFFER.

Witnesses:
CHAS. E. HERING,
B. H. SECHRIST.